US010523908B2

(12) United States Patent  
Mizuno

(10) Patent No.: US 10,523,908 B2  
(45) Date of Patent: Dec. 31, 2019

(54) LIGHT PROJECTION DEVICE

(71) Applicant: Funai Electric Co., Ltd., Daito, Osaka (JP)

(72) Inventor: Takao Mizuno, Hyogo (JP)

(73) Assignee: FUNAI ELECTRIC CO., LTD., Osaka (JP)

( * ) Notice: Subject to any disclaimer, the term of this patent is extended or adjusted under 35 U.S.C. 154(b) by 0 days.

(21) Appl. No.: 15/799,715

(22) Filed: Oct. 31, 2017

(65) Prior Publication Data

US 2018/0131911 A1    May 10, 2018

(30) Foreign Application Priority Data

Nov. 4, 2016 (JP) ................................ 2016-216098

(51) Int. Cl.
| | | |
|---|---|---|
| *H04N 9/31* | (2006.01) | |
| *G02F 1/133* | (2006.01) | |
| *G02F 1/139* | (2006.01) | |
| *G02B 27/01* | (2006.01) | |

(52) U.S. Cl.
CPC ....... *H04N 9/3158* (2013.01); *G02B 27/0101* (2013.01); *G02F 1/139* (2013.01); *G02F 1/13318* (2013.01); *H04N 9/3155* (2013.01); *H04N 9/3164* (2013.01); *H04N 9/3194* (2013.01); *G02B 2027/014* (2013.01); *G02B 2027/0116* (2013.01); *H04N 9/3129* (2013.01)

(58) Field of Classification Search
CPC .............. H04N 9/3158; G02B 27/0101; G02F 1/13318

USPC .................. 348/191, 744, 760; 345/207, 690
See application file for complete search history.

(56) References Cited

U.S. PATENT DOCUMENTS

| 2015/0172645 | A1* | 6/2015 | Nobori ................. H04N 9/3155 |
| | | | 348/759 |
| 2017/0098400 | A1* | 4/2017 | Yamakawa ............ G02B 26/10 |
| 2017/0099469 | A1* | 4/2017 | Matsumoto ........ G02B 27/0101 |
| 2017/0290131 | A1* | 10/2017 | Ito ............................ G02B 5/30 |

FOREIGN PATENT DOCUMENTS

| JP | 2013-015738 A | 1/2013 |
| WO | 2015-182653 A1 | 12/2015 |

OTHER PUBLICATIONS

Extended European Search Report of the corresponding European Application No. 17199750.5, dated Mar. 8, 2018.

\* cited by examiner

*Primary Examiner* — Jefferey F Harold  
*Assistant Examiner* — Jean W Desir  
(74) *Attorney, Agent, or Firm* — Global IP Counselors, LLP

(57) ABSTRACT

A light projection device includes a plurality of light sources, a transmission component, and a controller. The light sources output light of mutually different wavelengths. The transmission component transmits the light at a transmissivity of the light for each wavelength. The controller controls amount of light of the light sources based on transmissivity information indicating a change in the transmissivity for each wavelength.

19 Claims, 12 Drawing Sheets

LIGHT PROJECTION DEVICE

CROSS-REFERENCE TO RELATED APPLICATIONS

This application claims priority to Japanese Patent Application No. 2016-216098 filed on Nov. 4, 2017. The entire disclosure of Japanese Patent Application No. 2016-216098 is hereby incorporated herein by reference.

BACKGROUND

Field of the Invention

The present invention generally relates to a light projection device.

Background Information

There are conventional light projection devices that render an image by projecting light of RGB colors, for example, from a plurality of light sources onto a projection surface. With such a light projection device, the light sources are periodically subjected to APC (auto power control) to correct the white balance of the projected light. APC is usually performed once every blanking period between image frames (a period in which the light sources are off), and is not performed again until the next blanking period.

Also, with a light projection device, in the adjustment of the brightness of the image, the amount of projected light is adjusted by a dimming attenuator having a liquid crystal element. For example, the amount of light projected onto the projection surface is adjusted by changing the applied drive voltage and thereby adjusting the transmissivity of the liquid crystal element through which the projection light passes.

Japanese Patent Application Publication No. 2013-15738 (Patent Literature 1) discloses a head-up display device in which a liquid crystal cell is provided to each of a plurality of laser light sources. The brightness of the displayed image is adjusted by adjusting the transmissivity of the laser light passing through each liquid crystal cell by means of adjustment of the drive voltage applied to each liquid crystal cell.

SUMMARY

However, when the drive voltage is changed, the transmissivity of the liquid crystal element gradually changes. The response time thereof is longer than the blanking period between image frames. Also, the transmissivity of the liquid crystal element corresponding to the drive voltage and the change in the transmissivity in a transient state are different for each wavelength of the transmitted light. Therefore, with an optical system that adjusts the amount of projected light using a dimming attenuator as discussed above, the white balance of projected light may be lost during the rendering period of the image frame in the response time of the liquid crystal element, causing chromaticity deviation to exceed its target range. If this happens, an image in which the coloring gradually changes will end up being displayed. Patent Literature 1 is silent about such a problem.

One object is to provide a light projection device with which the amount of light can be adjusted while keeping deviation of the chromaticity of the light within a specific range.

[1] In view of the state of the known technology and in accordance with an aspect of the present invention, a light projection device comprises a plurality of light sources, a transmission component and a controller. The light sources output light of mutually different wavelengths. The transmission component transmits the light at a transmissivity of the light for each wavelength. The controller controls amount of light of the light sources based on transmissivity information indicating a change in the transmissivity for each wavelength.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
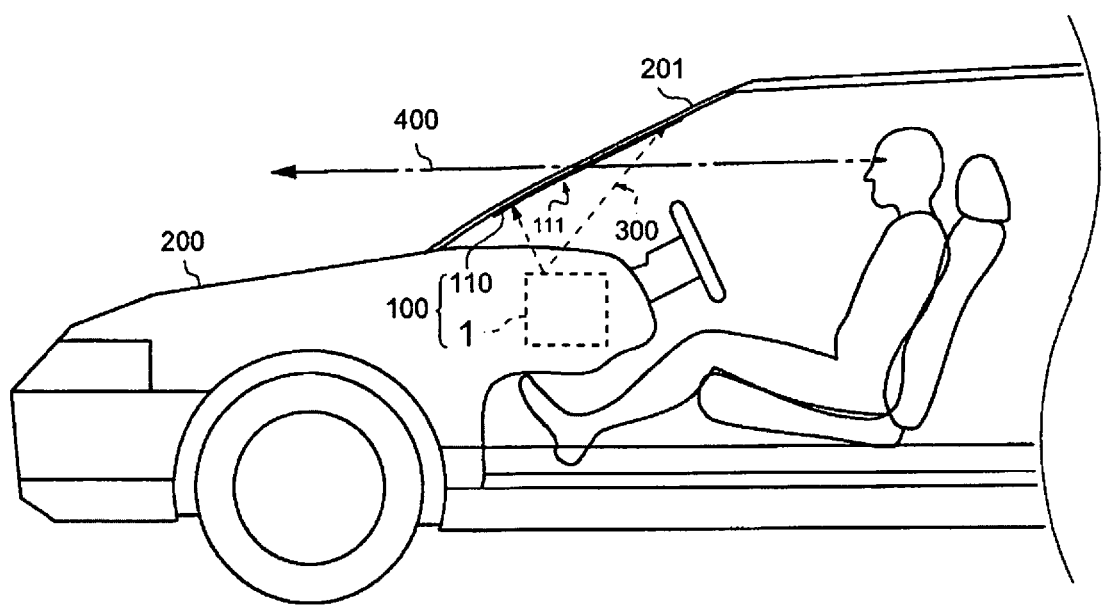
FIG. 1 is a simplified diagram of an HUD device.

Referring to FIG. 1, a head-up display device 100 for a vehicle 200 is illustrated in accordance with the embodiments. In the following, the head-up display device 100 will be called the HUD device 100. Also, the horizontal direction of a projection surface 111 onto which a laser light 300 is projected and a direction corresponding to the horizontal direction of the projection surface 111 will be referred to simply as the "horizontal direction," which is labeled "X" here. The vertical direction of the projection surface 111 and a direction corresponding to the vertical direction of the projection surface 111 will be referred to simply as the "vertical direction," which is labeled "Y."

First Embodiment

FIG. 1 is a simplified diagram of the HUD device 100. The HUD device 100 of this embodiment is installed in the vehicle 200. The HUD apparatus 100 comprises a projector unit 1 and a combiner 110. The projector unit 1 projects the laser light 300 from the optical unit toward the windshield 201 of the vehicle 200. The projector unit 1 further scans the projected laser light 300 so as to superimpose and display the projected image within the field of view of the user. In FIG. 1, the one-dot chain line arrow 400 indicates the line of sight of the user sitting in the driver's seat of the vehicle 200. The HUD device 100 is not limited to being installed in the vehicle 200, and may instead be installed in some other mode of transportation (such as an aircraft).

As shown in FIG. 1, the combiner 110 is affixed to the inner surface of the windshield 201. This combiner 110 is a member used for displaying the projected image of the projector unit 1 within the field of view of the user, and is formed using a semi-transmissive reflective material such as a half mirror, for example. A virtual image is formed on the projection surface 111 of the combiner 110 by projecting a scanned laser light 300 from the projector unit 1 onto the combiner 110. Accordingly, a user looking toward the front of the vehicle 200 (that is, the direction of the line of sight 400) can simultaneously view an external image of what is in front of the vehicle 200 and the projection image that is projected from the projector unit 1.

Figure 2:
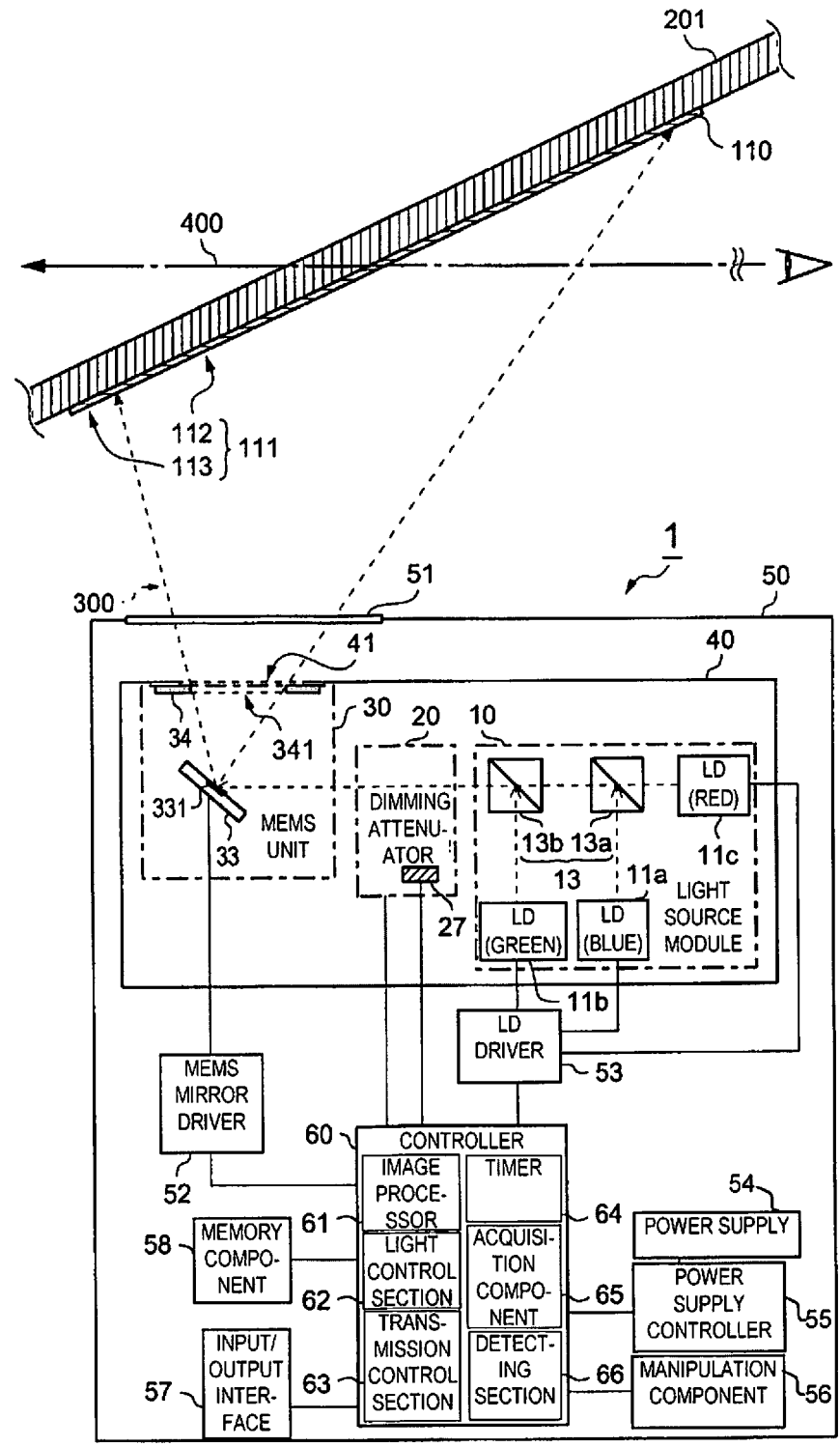
FIG. 2 is a block diagram showing an example of the configuration of a projector unit.
Figure 3:
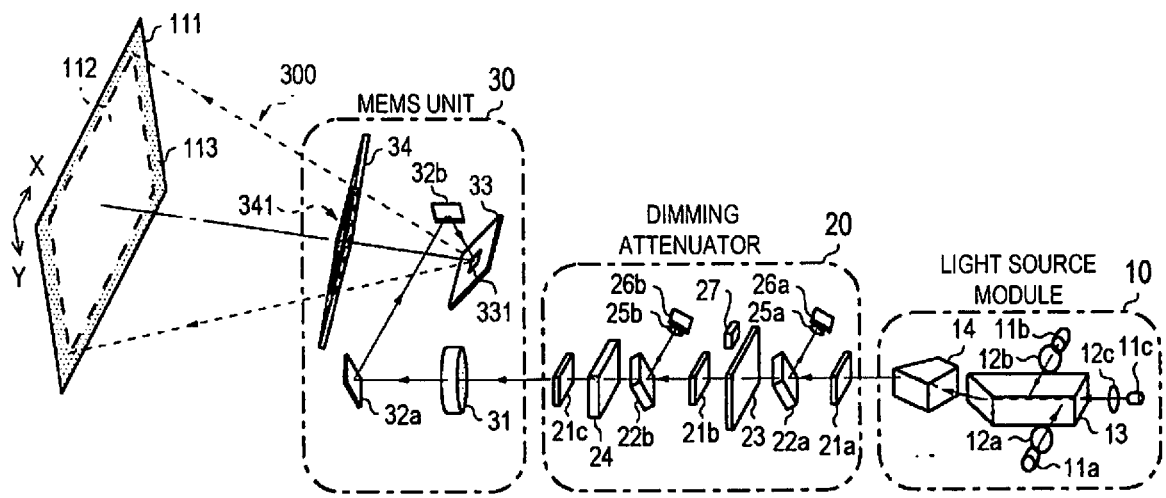
FIG. 3 is a concept diagram showing an example of the configuration of an optical unit.

Next, the projector unit 1 will be described. FIG. 2 is a block diagram showing an example of the configuration of the projector unit 1. FIG. 3 is a concept diagram showing an example of the configuration of an optical unit.

The projector unit 1 is a light projection device that projects the laser light 300 onto the projection surface 111 and displays an image in each frame on the projection surface 111, and comprises an optical unit that emits the laser light 300, and an optical system housing 40. The optical system housing 40 houses the optical unit in its interior. An opening 41 is formed in the optical system housing 40. The laser light 300 emitted from the optical unit is emitted to the outside of the optical system housing 40 through the opening 41. The opening 41 is formed using glass or a translucent resin material, for example.

The optical unit is made up of a light source module 10, a dimming attenuator 20, and a MEMS unit 30.

The light source module 10 has LDs 11a to 11c, collimator lenses 12a to 12c, a light combining member 13 composed of beam splitters 13a and 13b, and a prism 14. In the following description, the LDs 11a to 11c are referred to as the LDs (laser diodes) 11a to 11c.

The LDs 11a to 11c are an example of light sources that emit the laser light 300, and each output an amount of laser light corresponding to a light output signal outputted from an LED driver 53 (discussed below), based on this light output signal. In this embodiment, the light output signals outputted to the LDs 11a to 11c are drive currents I supplied to the LDs 11a to 11c. The LD 11a is a semiconductor laser element that emits blue laser light. The LD 11b is a semiconductor laser element that emits green laser light. The LD 11c is a semiconductor laser element that emits red laser light. The light combining member 13 combines the laser light of each color outputted from the LDs 11a to 11c into the laser light 300, and outputs the laser light 300 to the prism 14. Thus, the LDs 11a to 11c are laser diodes of different colors.

The blue laser light emitted from the LD 11a is converted into parallel light by the collimator lens 12a, reflected by the beam splitter 13a, and outputted to the dimming attenuator 20 via the beam splitter 13b and the prism 14. The green laser light emitted from the LD 11b is converted into parallel light by the collimator lens 12b, reflected by the beam splitter 13b, and outputted to the dimming attenuator 20 via the prism 14. The red laser light emitted from the LD 11c is converted into parallel light by the collimator lens 12c, and is outputted to the dimming attenuator 20 via the beam splitters 13a and 13b and the prism 14.

The dimming attenuator 20 is a transmission component that adjusts the transmissivity Lp of the laser light 300 for each wavelength and transmits the result. The dimming attenuator 20 has polarizing filters 21a, 21b, and 21c, half mirrors 22a and 22b, a liquid crystal element 23, a half-wave plate 24, light amount filters 25a and 25b, and OEICs 26a and 26b.

The liquid crystal element 23 is controlled by a transmission control section 63 (discussed below). Specifically, drive of the liquid crystal element 23 is controlled by an applied drive voltage (a control signal outputted from the transmission control section 63). The liquid crystal element 23 changes the polarization angle of the incident laser light 300 according to the drive voltage and transmits the laser light 300 at the transmissivity Lp for each wavelength according to the drive voltage. The OEICs 26a and 26b are each a light receiving IC, including a photodiode. The OEIC 26a is a photosensor for sensing the amount of light of the laser light 300 inputted to the dimming attenuator 20 for each wavelength, and in this embodiment, the amount of light of the laser light 300 incident on the liquid crystal element 23 is sensed for each wavelength. The OEIC 26b is a photosensitive for sensing the amount of light of the laser light 300 outputted by the dimming attenuator 20 for each wavelength, and in this embodiment, the amount of light of the laser light 300 transmitted through the liquid crystal element 23 is sensed for each wavelength. A thermistor 27 is a temperature sensor that senses the temperature of the dimming attenuator 20, and is provided to sense the temperature of the liquid crystal element 23 in particular. The sensing result of the thermistor 27 is outputted to a controller 60.

Of the laser light 300 emitted from the light source module 10, the laser light 300 whose polarization direction is the vertical direction Y is transmitted through the polarizing filter 21a. Part (such as 99%) of the laser light 300 transmitted through the polarizing filter 21a is transmitted through the half mirror 22a, and the remaining part (such as 1%) is reflected by the half mirror 22a. The amount of light of the laser light 300 reflected by the half mirror 22a is reduced by the light amount filter 25a and sensed by the OEIC 26a. The sensing result of the OEIC 26a is outputted to the controller 60. On the other hand, the laser light 300 transmitted through the half mirror 22a is polarized in a specific direction by the liquid crystal element 23. In this embodiment, the polarization angle of the laser light 300 is rotated by 90 degrees.

Also, the amount of light of the laser light 300 is adjusted when the laser light 300 passes through the liquid crystal element 23 at the transmissivity Lp for each wavelength. Hereinafter, adjustment of the amount of light of the laser light 300 shall be referred to as "dimming." FIG. 4 is a graph showing an example of the transmission characteristics of the liquid crystal element 23.

The transmissivity Lp is the ratio of the amount of light of the laser light 300 passing through the liquid crystal element 23 to the amount of light of the laser light 300 incident on the liquid crystal element 23, and is represented by a numerical value of at least 0 and no more than 1.0. In the following description, for example, the transmissivity Lp of the laser light of each color (R, G, and B) may be referred to collectively as just the "transmissivity Lp." The transmissivity ratio is the ratio of the transmissivity Lp of light of another wavelength, using the transmissivity Lp of light of a specific wavelength as a reference. In this embodiment, the transmissivity Lp of green light G is used as a reference. That is, the ratio of the transmissivity Lp of red light R to the transmissivity Lp of green light G is referred to as the "R transmissivity ratio," and the ratio of the transmissivity Lp of blue light B to the transmissivity Lp of green light G is referred to as the "B transmissivity ratio."

Figure 4:
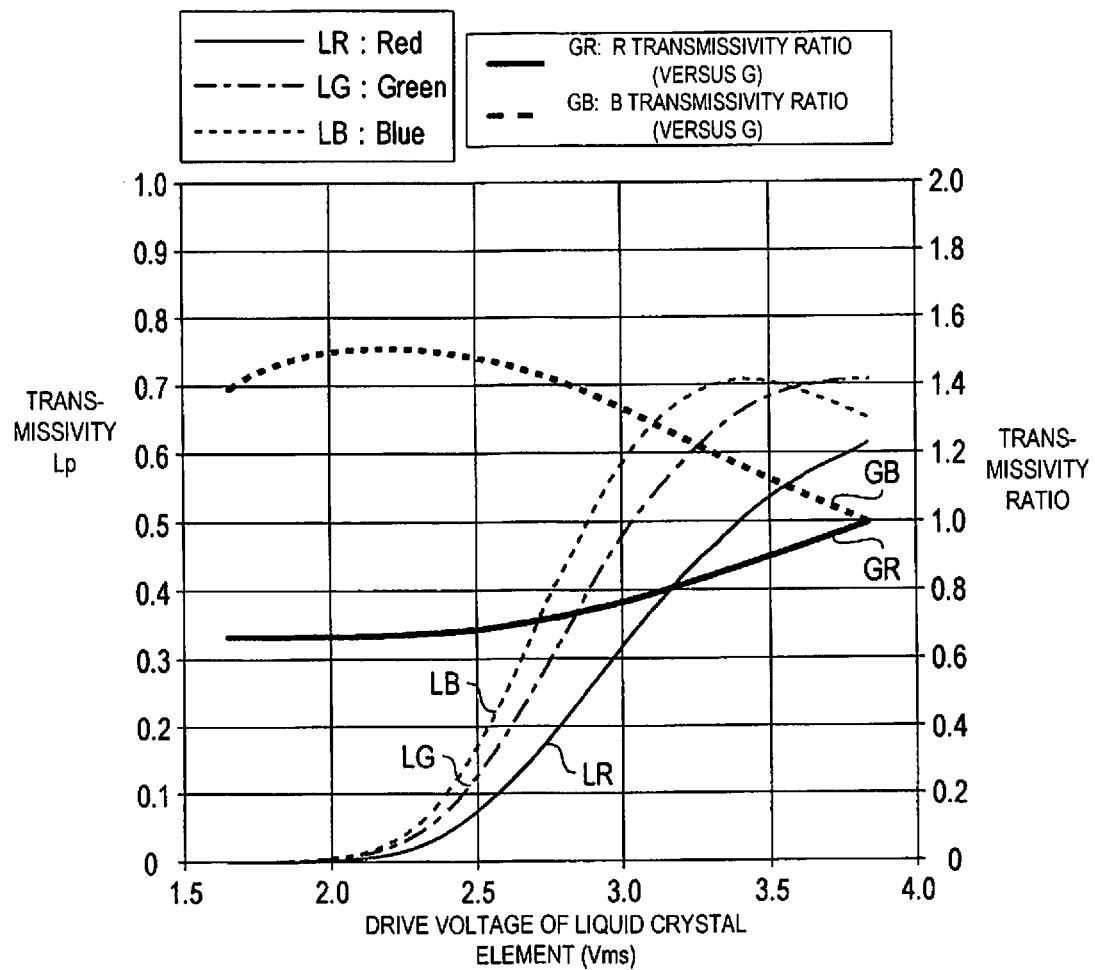
FIG. 4 is a graph showing an example of transmission characteristics of a liquid crystal element.

In FIG. 4, the solid line LR indicates the change in the control value of the transmissivity Lp of the red laser light R with respect to the drive voltage applied to the liquid crystal element 23. The one-dot chain line LG indicates the change in the control value of the transmissivity Lp of the green laser light G with respect to the drive voltage applied to the liquid crystal element 23. The broken line LB shows the change in the control value of the transmissivity Lp of the blue laser light B with respect to the drive voltage applied to the liquid crystal element 23. Here, the control value of the transmissivity Lp is the value of the transmissivity Lp in a steady state corresponding to the drive voltage. The thick solid line GR indicates the change in the R transmissivity ratio with respect to the drive voltage applied to the liquid crystal element 23. The thick broken line GB indicates the change in the B transmissivity ratio with respect to the drive voltage applied to the liquid crystal element 23.

As shown in FIG. 4, the control value of the transmissivity Lp for each wavelength of the liquid crystal element 23 varies according to the drive voltage. Furthermore, these changes are different for each wavelength of the transmitted light. A specific configuration in which the dimming control of the laser light 300 is performed in the liquid crystal element 23 of the dimming attenuator 20 will be described below.

Going back to FIG. 3, of the laser light 300 transmitted through the liquid crystal element 23, the laser light 300 whose polarization direction is the horizontal direction X passes through the polarizing filter 21b. Part (such as 99%) of the laser light 300 transmitted through the polarizing filter 21b is transmitted through the half mirror 22b, and the remaining part (such as 1%) is reflected by the half mirror 22b. The amount of light for each wavelength of the laser light 300 reflected by the half mirror 22b is reduced by the light amount filter 25b and sensed by the OEIC 26b. The sensing result of the OEIC 26b is outputted to the controller 60. On the other hand, at the half-wave plate 24, the polarization direction of the laser light 300 transmitted through the half mirror 22a is rotated by 45 degrees. Among the laser light 300 transmitted through the half-wave plate 24, the laser light 300 whose polarization direction is 45 degrees is transmitted through the polarizing filter 21c and outputted to the MEMS unit 30.

The MEMS unit 30 is an image formation component that forms an image in each frame on the projection surface 111. The MEMS unit 30 has a converging lens 31, mirrors 32a and 32b, a biaxial MEMS mirror device 33, and a light blocking frame 34 in which an opening 341 is formed. Although the light blocking frame 34 in this embodiment is provided along the edge of the opening 41 of the optical system housing 40 and to the inside of the edge of the opening 41, this is not the only option, and the light blocking frame 34 may be provided along the edge of a light emission port 51 of the housing 50, on the inside of the edge of this light emission port 51.

The laser light 300 outputted from the dimming attenuator 20 is focused by the converging lens 31, reflected by the mirrors 32a and 32b in that order, and is incident on the biaxial MEMS mirror device 33. The biaxial MEMS mirror device 33 has a mirror 331 that can be pivoted. The mirror 331 is an optical projection member that reflects the laser light 300 incident from the converging lens 31 via the mirrors 32a and 32b, and projects the light toward the projection surface 111. The laser light 300 projected from the mirror 331 passes through the opening 41 of the optical system housing 40 and the light emission port 51, is emitted to the outside of the projector unit 1, and is projected onto the projection surface 111 on the combiner 110.

Here, the laser light 300 projected toward the projection surface 111 is limited by the light blocking frame 34. The light blocking frame 34 is a light blocking component that blocks the laser light 300 that the mirror 331 projects toward the outside of a display area 112. More specifically, of the laser light 300 projected from the mirror 331, the laser light 300 incident on an opening 341 of the light blocking frame 34 is transmitted through the opening 341 and projected onto the display area 112 of the projection surface 111. On the other hand, the laser light 300 projected onto the light blocking frame 34 is projected toward a blanking area 113 outside the display area 112 on the projection surface 111, is blocked by the light blocking frame 34, and is not projected onto the projection surface 111. The blanking area 113 is a region of the projection surface 111 where the laser light 300 is not projected. In the horizontal direction X, the width of the display area 112 is, for example, about 80% of the width of the projection surface 111, and the width of each blanking region 113 is set to about 10% of the width of the projection surface 111, for example.

The biaxial MEMS mirror device 33 also functions as a light scanner that causes the mirror 331 to move back and forth over a specific angular range in a specific direction on the projection surface 111 and in a direction intersecting that specific direction. In this embodiment, the biaxial MEMS mirror device 33 can reciprocally scan the laser light 300 in the horizontal direction X and the vertical direction Y by pivoting the mirror 311 in the horizontal direction X and the vertical direction Y of the projection surface 111. Hereinafter, reciprocal operation of the mirror 331 in one direction (such as the horizontal direction X or the vertical direction Y) within a specific angular range will sometimes be referred to as "pivoting." The configuration by which the laser light 300 is reciprocally scanned will be discussed in detail below.

In this embodiment, the laser light 300 is scanned using the biaxial MEMS mirror device 33, but this is not the only option, and the laser light 300 may instead be scanned using a MEMS mirror device for vertical scanning and a MEMS mirror device for horizontal scanning. In other words, the MEMS unit 30 may have a MEMS mirror device having a mirror capable of pivoting in the vertical direction Y of the projection surface 111 and a MEMS mirror device capable of pivoting in the horizontal direction X of the projection surface 111, in place of the biaxial MEMS mirror device 33.

Next, the remaining configuration of the projector unit 1 will be described, referring again to FIG. 2. The projector unit 1 further comprises a main body housing 50, a MEMS mirror driver 52, an LD driver 53, a power supply 54, a power supply controller 55, a manipulation component 56, an input/output interface 57, a memory component 58 (e.g., a computer memory), and an electronic controller 60.

The main body housing 50 houses the optical system housing 40 that holds an optical unit, the MEMS mirror driver 52, the LD driver 53, the power supply 54, the power supply controller 55, the manipulation component 56, the input/output interface 57, the memory component 58, and the controller 60. The light emission port 51 is formed in the main body housing 50. The laser light 300 that has passed through the opening 41 in the optical system housing 40 is further emitted through the light emission port 51 to the combiner 110. This light emission port 51 may be an opening, but is preferably formed using glass, a translucent resin material, or the like, for example. This prevents dust and moisture (such water droplets or air containing water vapor) and the like from penetrating into the interior of the main body housing 50.

The MEMS mirror driver 52 is a scan controller that controls the biaxial MEMS mirror device 33 based on a control signal inputted from the controller 60. For instance, the MEMS mirror driver 52 controls the pivoting of the mirror 331 in the horizontal direction X in response to a horizontal synchronization signal outputted from the controller 60, and controls the mirror 331 in the vertical direction Y in response to a vertical synchronization signal outputted from the controller 60.

The LD driver 53 is a light source driver that drives the LDs 11a to 11c. The LD driver 53 generates a light output signal based on the light control signal outputted from the controller 60, and outputs this light output signal to the LDs 11a to 11c. More specifically, the LD driver 53 outputs a drive current I based on the light control signal to each LD 11a to 11c.

The power supply 54 is, for example, a component that receives power from a power source, such as a storage battery (not shown) of the vehicle 200. The power supply controller 55 converts the power supplied from the power supply 54 into specific voltage and current values corresponding to the constituent components of the projector unit 1, and supplies the converted power to those components. The manipulation component 56 is an input unit for accepting manipulation inputs from the user. The input/output interface 57 is a communication interface for wired communication or wireless communication with external devices.

The memory component 58 is a non-transitory storage medium, and stores programs, control information, and so forth used by the components of the projector unit 1, for example. The memory component 58 also stores information about the image projected on the projection surface 111, light output table information related to the LDs 11a to 11c, information about the transmissivity of the liquid crystal element 23, etc. The light output table information gives values such as the drive current I and the light output of the LDs 11a to 11c corresponding the sensed values for the amount of light for each wavelength sensed by the OEICs 26a and 26b. Transmissivity information is information indicating the change over time in the transmissivity Lp for each wavelength of the liquid crystal element 23, and indicates the change in the transmissivity Lp for each wavelength corresponding to the elapsed time from the point when the control value of the transmissivity Lp was changed. The change in the transmissivity Lp for each wavelength of the liquid crystal element 23 in a transient state is different when the transmissivity Lp increases and when the transmissivity Lp decreases. Therefore, the change in the transmissivity Lp for each wavelength indicated by the transmissivity information is different when the transmissivity Lp increases and when the transmissivity Lp decreases.

The controller 60 uses the programs, control information, and so forth stored in the memory component 58 to control the constituent components of the projector unit 1. As shown in FIG. 2, the controller 60 has an image processor 61, a light control section 62 (e.g., a control section), the transmission control section 63, a timer 64, an acquisition component 65, and a detecting section 66. The controller 60 includes a microcomputer or processor with a control program that controls the projector unit 1. The controller 60 can also include other conventional components such as an input interface circuit, an output interface circuit, and storage devices such as a ROM (Read Only Memory) device and a RAM (Random Access Memory) device. The microcomputer of the controller 60 is programmed to control the projector unit 1. The storage devices stores processing results and control programs that are run by the processor circuit. The RAM stores statuses of operational flags and various control data. The ROM stores the control programs for various operations. It will be apparent to those skilled in the art from this disclosure that the precise structure and algorithms for controller 60 can be any combination of hardware and software that will carry out the functions of the present invention. Specifically, the controller 60 can be formed by a single processor that serves as the image processor 61, the light control section 62, the transmission control section 63, the timer 64, the acquisition component 65 and the detecting section 66. Alternatively, the controller 60 can be formed by a plurality of processors that serve as the image processor 61, the light control section 62, the transmission control section 63, the timer 64, the acquisition component 65 and the detecting section 66.

The image processor 61 generates image information based on the program stored in the memory component 58, information inputted from the input/output interface 57, information stored in the memory component 58, and so forth. The image processor 61 also converts the generated image information into the three colors of image data of red (R), green (G), and blue (B). The converted three-color image data is output to the light control section 62.

The light control section 62 controls the LDs 11a to 11c by outputting a light output signal from the LD driver 53 to each of the LDs 11a to 11c. More specifically, the light control section 62 generates light control signals for the LDs 11a to 11c based on the three-color image data. For example, with the LD 11a, the light control section 62 determines the light output P of the LD 11a based on the image data for blue (B), and determines the drive current I of the LD 11a based on the light output characteristics of the LD 11a (see FIG. 5, for example). Then, the light control section 62 generates a light control signal indicating the drive current I, and outputs this to the LD driver 53. The same applies to the other LDs 11b and 11c, so they will not be described here.

The light control section 62 also controls the amount of light of the LDs 11a to 11c based on transmissivity information indicating the change in the transmissivity Lp for each wavelength of the laser light 300. More specifically, the light control section 62 determines, generates, and outputs light output signals for the LDs 11a to 11c during the elapsed time since the point when the control value of the transmissivity Lp for each wavelength of the laser light 300 was changed, based on transmissivity information indicating the elapsed time and the change in the transmissivity Lp for each wavelength corresponding to the elapsed time.

The transmission control section 63 controls the transmissivity Lp for each wavelength of the laser light 300. More specifically, the transmission control section 63 changes the control value of the transmissivity Lp for each wavelength of the laser light 300 transmitted through the dimming attenuator 20 by outputting a control signal to the dimming attenuator 20. In this embodiment, the transmission control section 63 changes the control value of the transmissivity Lp for each wavelength of the laser light 300 transmitted through the liquid crystal element 23 by changing the drive voltage applied to the liquid crystal element 23 (see FIG. 4).

The timer 64 is a timing component that keeps track of time such as the current clock time and the elapsed time since a specific point in time. For example, the timer 64 keeps track of the elapsed time since the point when the control value of the transmissivity Lp was changed.

Figure 5:
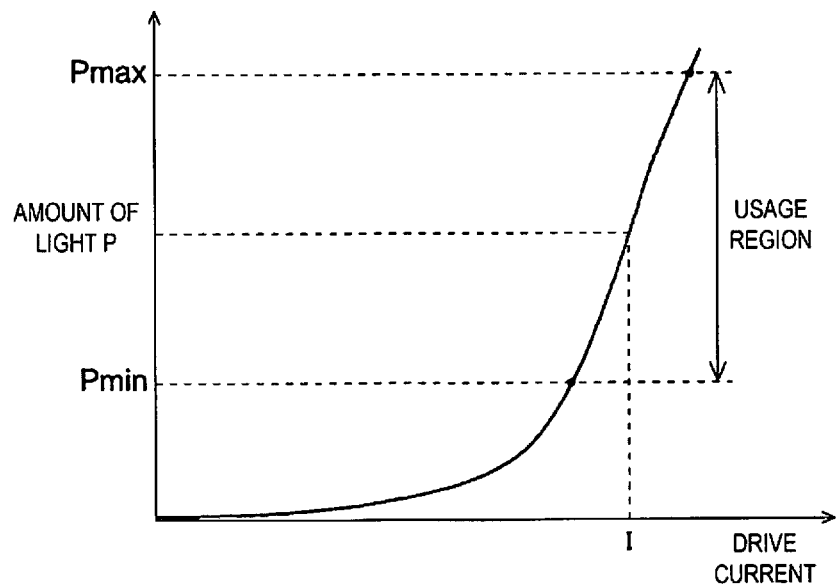
FIG. 5 is a graph showing an example of light output characteristics of an LD.

The acquisition component 65 acquires the light output characteristics for each of the LDs 11a to 11c in the blanking period between adjacent pair of frames of the image displayed on the projection surface 111, for example, based on the sensing result of the OEICs 26a and 26b and the light output signals outputted to the LDs 11a to 11c by the light control section 62. There are no particular restrictions on how the light output characteristics are acquired. For example, the LD 11a is made to emit a different, specific amount of light a plurality of times. Then, a curve of the light output characteristics of the LD 11a (as shown in FIG. 5) can be produced based on the light output control signal outputted to the LD 11a during each emission, and the amount of the blue laser light sensed by the OEIC 26a or 26b during each emission. Light output characteristic curves can be similarly produced for the LDs 11b and 11c.

The detecting section 66 detects the transmissivity Lp for each wavelength of the laser light 300 transmitted through the liquid crystal element 23 based on the sensing results of the OEICs 26a and 26b. That is, the detecting section 66 detects the transmissivity Lp for each wavelength of the dimming attenuator 20 based on the above-mentioned sensing results.

Figure 6A:
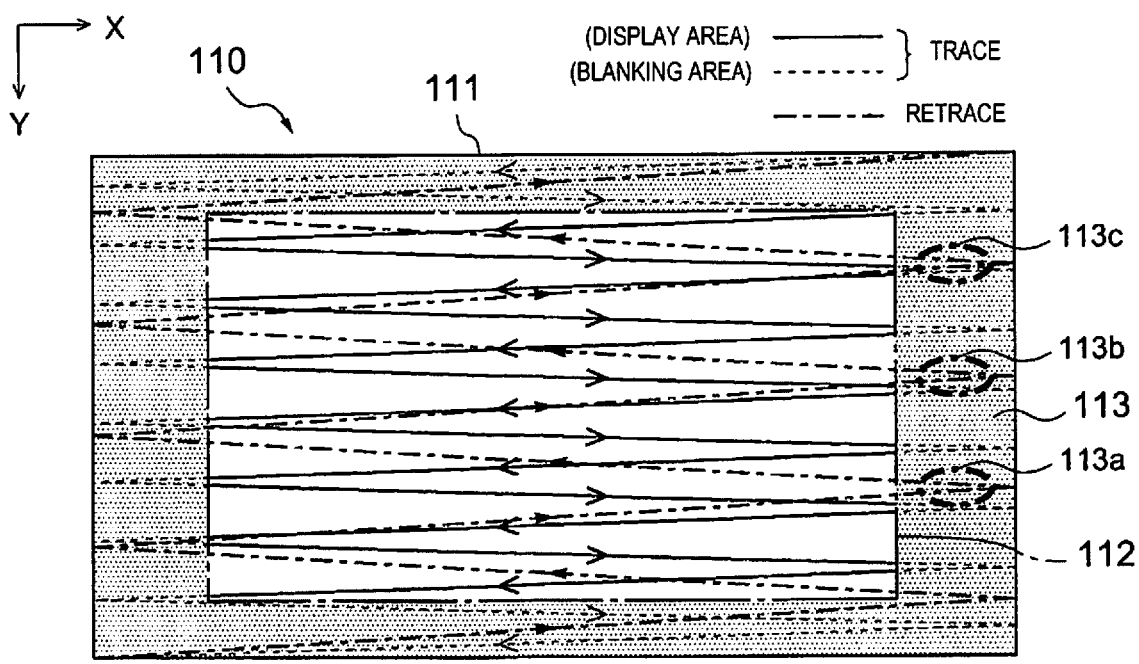
FIG. 6A is a concept diagram showing reciprocal scanning of a laser light.
Figure 6B:
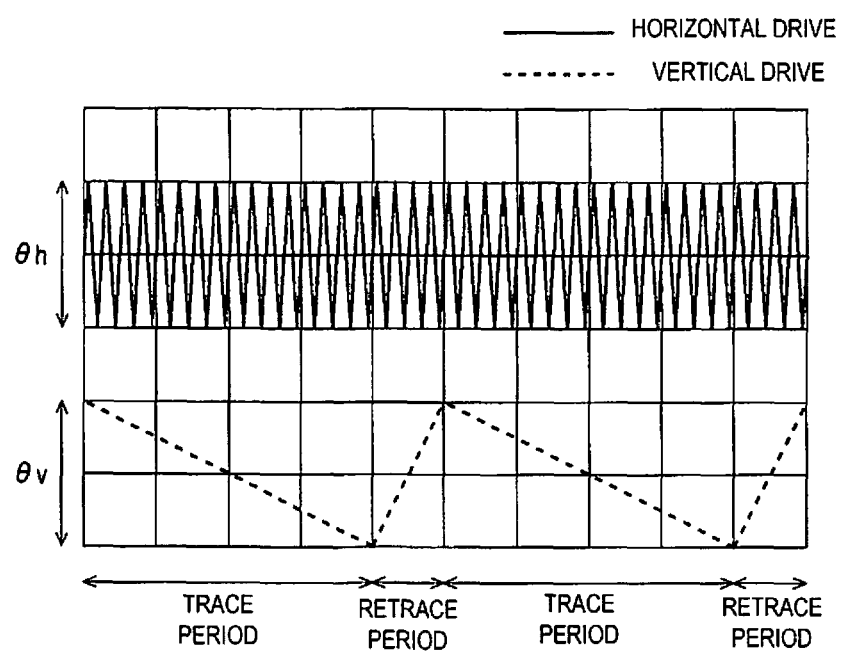
FIG. 6B is a graph showing an example of horizontal drive and vertical drive of a mirror.

Next, the configuration by which the laser light 300 is scanned back and forth will be described in detail. FIG. 6A is a concept diagram showing the reciprocal scanning of the laser light 300. FIG. 6B is a graph showing an example of horizontal drive and vertical drive of the mirror 331. In FIGS. 6A and 6B, the trace period is the period during which the laser light 300 is reciprocally scanned in a zigzag pattern in the horizontal direction X and is scanned downward in the vertical direction Y. The retrace period is the period during which the virtual laser light 300 is reciprocally scanned in a zigzag pattern in the horizontal direction X and is scanned upward in the vertical direction Y.

The solid line in FIG. 6A indicates the path of the spot of the laser light 300 that is projected from the mirror 331 and scanned in the display area 112 during the trace period. The broken line in FIG. 6A indicates the path of the spot of the virtual laser light 300 that is scanned in the blanking area 113 when it is assumed that the laser light 300 from the mirror 331 has been projected onto the blanking area 113 of the projection surface 111 during the trace period. The one-dot chain line in FIG. 6A indicates the path of the spot of the virtual laser light 300 that is scanned in the projection surface 111 when it is assumed that the laser light 300 from the mirror 331 has been projected onto the projection surface 111 during the retrace period. That is, the retrace period is also a feedback period required for the virtual light spot to return to the initial position of the display area 112. Also, in FIG. 6B, the waveform with the solid line indicates horizontal drive of the mirror 331 (that is, pivoting in the horizontal direction X), while the waveform with the broken line indicates vertical drive of the mirror 331 (that is, pivot in the vertical direction Y). Also, the vertical width of the solid line waveform indicates the angular range θh of horizontal drive of the mirror 331, while the vertical width of the broken line waveform indicates the angular range θv of vertical drive of the mirror 331.

As shown in FIG. 6B, the angular range θh of pivoting in the vertical direction Y of the mirror 331 and the angular range θv of pivoting in the horizontal direction X are both constant. As shown in FIGS. 6A and 6B, when the mirror 331 is pivoted (reciprocal operation) in the vertical direction Y in the angular range θv, the laser light 300 is scanned back and forth in the vertical direction Y over the projection surface 111. Also, during the period in which the laser light 300 is scanned downward or upward in the vertical direction Y, when the mirror 331 is pivoted in the horizontal direction X in the angular range θh, the laser light 300 is scanned back and forth in the horizontal direction X on the projection surface 111. That is, scanning of the laser light 300 involves alternately performing zigzag reciprocal operation downward in the vertical direction Y and zigzag reciprocal operation upward in the vertical direction Y.

In the trace period, the mirror 331 is pivoted in the horizontal direction X in the angular range θh and is also tilted downward in the vertical direction Y in the angular range θv. The laser light 300 reflected by the mirror 331 is scanned back and forth in a zigzag pattern downward in the vertical direction Y of the projection surface 111. Here, the laser light 300 projected toward the blanking area 113 is blocked by the light blocking frame 34. Therefore, on the projection surface 111, the spot of the laser light 300 forms an image be being scanned back and forth in a zigzag pattern downward in the vertical direction Y in the display area 112. On the other hand, the laser light 300 is not projected into the blanking area 113, and the virtual light spot is scanned back and forth in a zigzag pattern downward in the vertical direction Y, as shown by the broken line in FIG. 6A. Thus, the trace period is made up of a rendering period in which an image is displayed in the display area 112, and a blanking period in which no image is displayed.

In the retrace period, the mirror 331 is pivoted in the horizontal direction X over an angular range θh and is also tilted upward in the vertical direction Y over the angular range θv. In the retrace period, the laser light 300 is usually not outputted from the LDs 11a to 11c, so the virtual spot is scanned back and forth in a zigzag pattern upward in the vertical direction Y, as indicated by the one-dot chain line in FIG. 6A. However, if the virtual spot is in the blanking area 113, the LDs 11a to 11c emit light in that order at a specific light output individually, and the light output characteristics are acquired by the acquisition component 65. For example, in FIG. 6A, when the virtual spot is located in the area 113a, the LD 11a emits light and the light output characteristics of the LD 11a are acquired. When the virtual spot is located in the area 113b, the LD 11b emits light and the light output characteristics of the LD 11b are obtained. When the virtual spot is located in the area 113c, the LD 11c emits light and the light output characteristics of the LD 11c are acquired.

Next, a configuration in which dimming of the laser light 300 is controlled by the dimming attenuator 20 will now be described pertaining to a comparative example and the first embodiment. In the comparative example and the first embodiment, the dimming control of the laser light 300 by the dimming attenuator 20 decreases the brightness of the image displayed in the display area 112.

Dimming Control of Comparative Example

Figure 7:
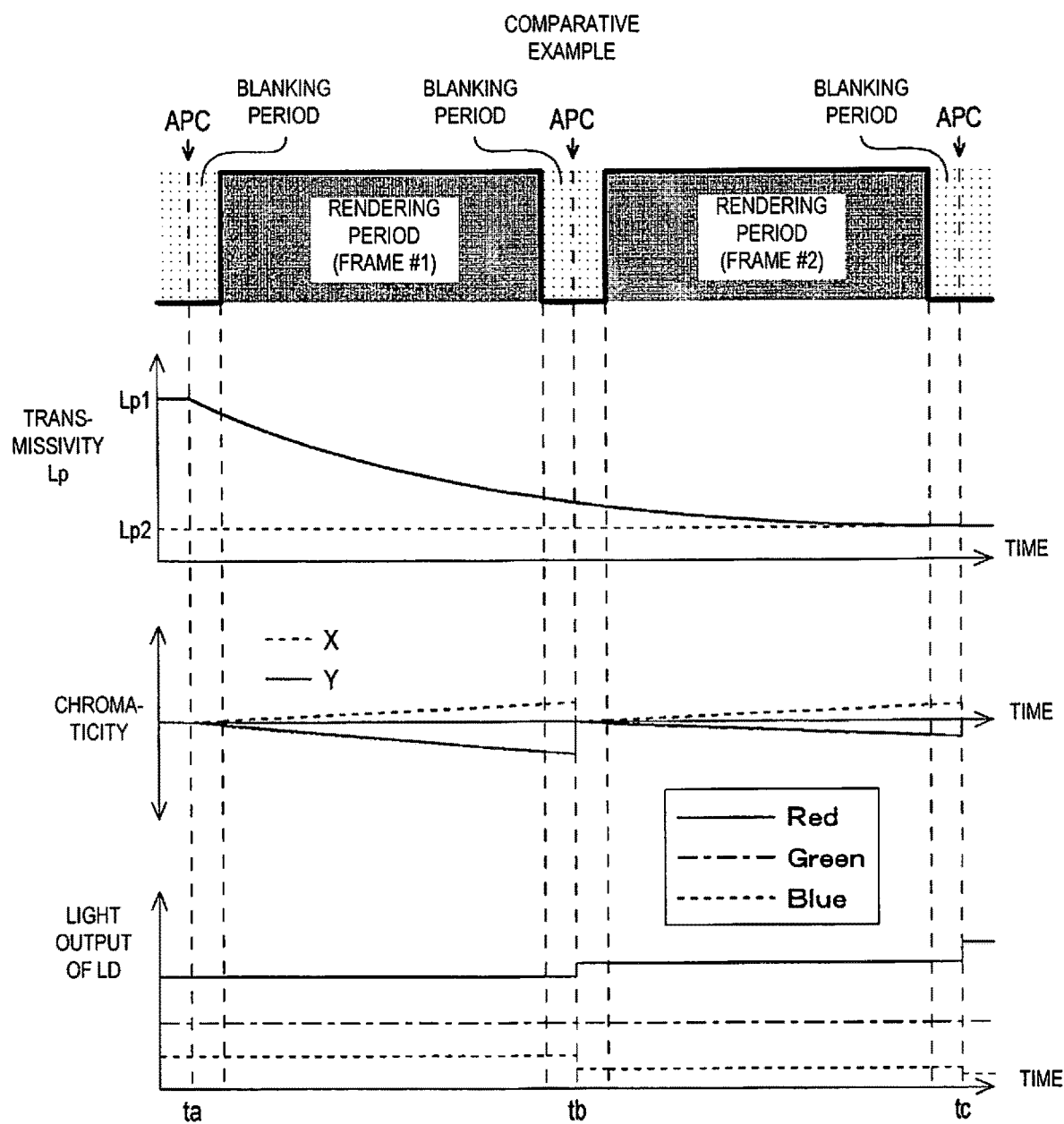
FIG. 7 shows dimming control of laser light in a comparative example.

First, a comparative example will be given. FIG. 7 shows dimming control of the laser light 300 in a comparative example. In FIG. 7, the graph at the top shows the timing at which an image is displayed in each frame on the projection surface 111. In the rendering period, each frame of the image is formed and displayed in the display area 112 by the scanning of the laser light 300. In the blanking period between rendering periods, no image is formed in the display area 112, and the spot of the virtual laser light 300 is fed back to a specific position. The second graph from the top illustrates the change over time in the transmissivity Lp for each wavelength of the laser light 300 transmitted through the liquid crystal element 23. FIG. 7 illustrates a case in which red laser light is incident. Because changes over time are the same with blue laser light and green laser light, these is not shown. The third graph from the top illustrates the change over time in chromaticity in an XYZ color system of the laser light 300 projected by the projector unit 1 onto the projection surface 111. In an XYZ color system, once the X and Y values are established, this also establishes the Z value. Therefore, the Z value is not depicted. The graph at the bottom illustrates the change over time in the amounts of red, green, and blue laser light outputted from the LDs 11a to 11c. The same applies to FIGS. 8 to 13 described below.

In the comparative example, as shown in FIG. 7, APC (auto power control) is performed at the points in time ta, tb, and tc during each blanking period. That is, the light output characteristics of the LDs 11a to 11c are acquired, and the light output of the LDs 11a to 11c is controlled based on the acquired light output characteristics.

At the point in time ta, dimming of the laser light 300 is commenced, and the drive voltage applied to the liquid crystal element 23 is reduced, which lowers the transmissivity Lp of the liquid crystal element 23 from control value Lp1 to the control value Lp2. Meanwhile, the response time required for the transmissivity Lp of the liquid crystal element 23 to reach the control value Lp2 (such as about 5 to 100 ms) is longer than the blanking period (such as 1 to 3 ms). Therefore, the transmissivity Lp of the liquid crystal element 23 gradually changes at a specific response rate up to the point in time tc.

In this comparative example, the light output control of the LDs 11a to 11c is not performed except at the points in time ta, tb, and tc. Therefore, the light output of the LDs 11a to 11c in each rendering period is constant, and the amount of each color of the laser light 300 incident on the dimming attenuator 20 is also constant. On the other hand, the transmissivity Lp of the liquid crystal element 23 corresponding to the drive voltage is different for each wavelength (see FIG. 4), and the response rate thereof (the change rate in the transmissivity Lp) is also different for each wavelength. Therefore, between the points in time ta to tc, as shown in FIG. 7, deviation occurs in the chromaticity of the laser light 300 projected onto the projection surface 111, and the white balance of the laser light 300 is lost. Also, the chromaticity deviation is corrected by APC at the points in time ta, tb, and tc, but the rendering period between the points in time ta, tb, and tc become longer over time. That is, the change in the white balance of the laser light 300 increases over time, and the hue of the image displayed in each rendering period ends up changing from the start of rendering to the end of rendering. Thus, in a comparative example, in the dimming of the laser light 300, the white balance is lost, and deviation in the chromaticity of the image cannot be kept within a specific permissible range.

Dimming Control of First Embodiment

Figure 8:
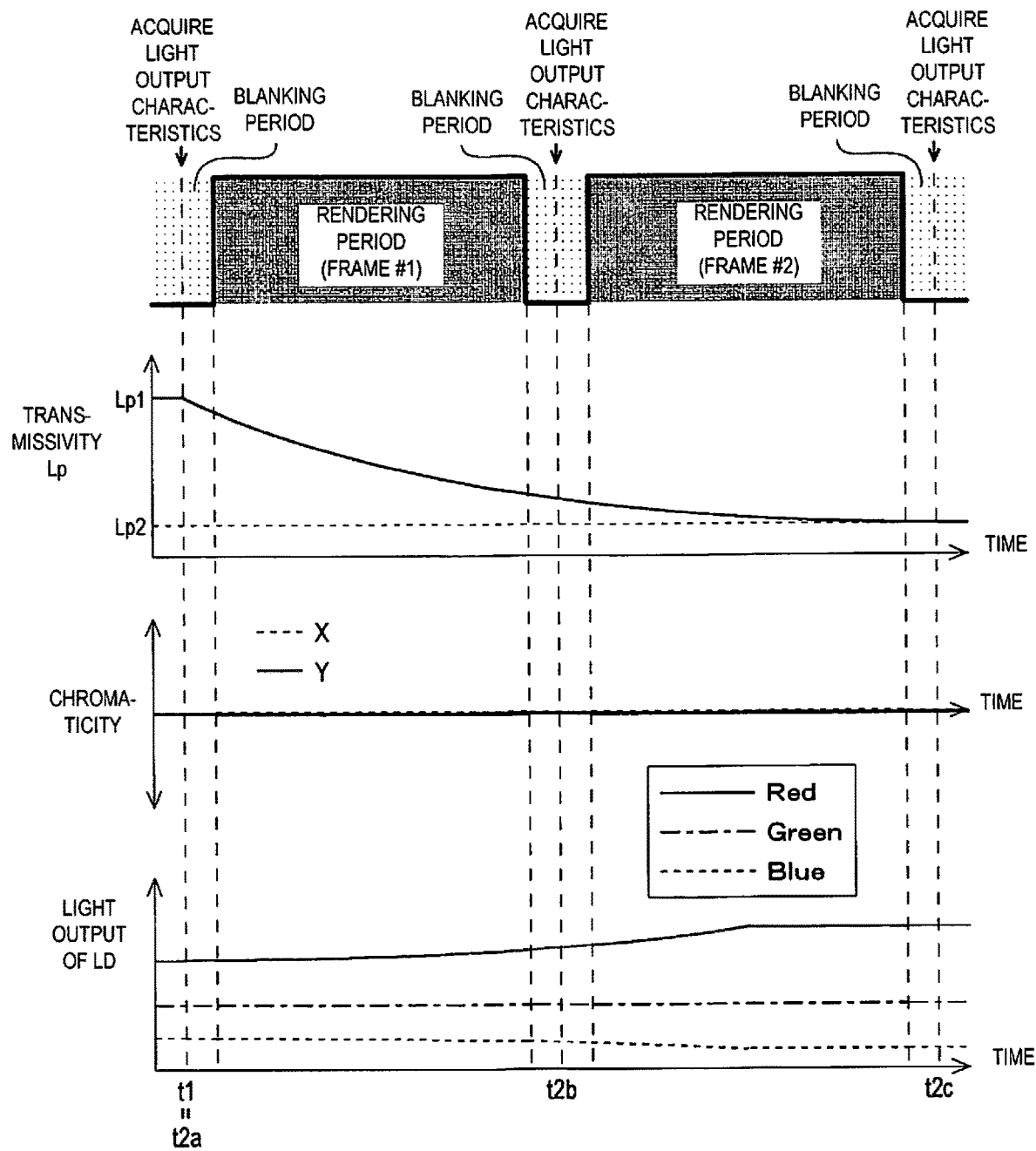
FIG. 8 shows an example of dimming control of laser light pertaining to a first embodiment.

Next, an example of this embodiment will be described. FIG. 8 shows an example of the dimming control of the laser light 300 pertaining to the first embodiment. In the illustrated embodiment, as shown in FIG. 8, the light output characteristics of the LDs 11a to 11c are acquired at the points in time t2a, t2b, and t2c in each blanking period.

Also, at the point in time t1 at which dimming of the laser light 300 is commenced, the transmissivity Lp of the liquid crystal element 23 is reduced from the control value Lp1 to the control value Lp2 (<Lp1) by reducing the drive voltage applied to the liquid crystal element 23. On the other hand, as described above, the response time of the liquid crystal element 23 (such as 5 to 100 ms) is longer than the blanking period. Therefore, the transmissivity Lp of the liquid crystal element 23 gradually decreases to the point in time t2c at a specific response rate.

In the illustrated embodiment, light output control of the LDs 11a to 11c is performed between the points in time t2a, t2b, and t2c (especially the rendering period). More specifically, the drive current I of each of the LDs 11a to 11c during the elapsed time is determined by the light control section 62 based on the elapsed time since the point in time t1 when the control value of the transmissivity Lp was changed, the transmissivity information stored in the memory component 58, and the light output characteristics acquired at the points in time t2a, t2b, and t2c prior to the rendering period for the frame. Consequently, the amount of light of the LDs 11a to 11c for the rendering period for the frame is controlled. For example, in the rendering period for frame #1, the transmissivity Lp of the liquid crystal element 23 in a transient state is predicted based on the transmissivity information and the elapsed time since the point in time t1. Then, the drive current I of each of the LDs 11a to 11c in the rendering period of frame #1 is determined based on the predicted transmissivity Lp and the light output characteristics acquired at the point in time t2a. Accordingly, in the rendering period for frame #1, the chromaticity deviation of the laser light 300 projected onto the projection surface 111 is corrected, so changes in the white balance of the laser light 300 can be accurately suppressed or prevented. Therefore, changes in the hue of the image displayed in each rendering period can be suppressed or prevented. Thus, in the illustrated embodiment, in the dimming of the laser light 300, chromaticity deviation in the image can be kept within a specific range.

In FIG. 8, the point in time t1 at which the dimming of the laser light 300 is commenced is the same as the point in time t2a at which the light output characteristics are acquired, but this is not the only option, and the point in time t1 may be different from the point in time t2a. In other words, the point in time t1 may be earlier than the point in time t2a, or may be later than the point in time t2a. The same applies to the other FIGS. 9 and 10 described below.

Figure 9:
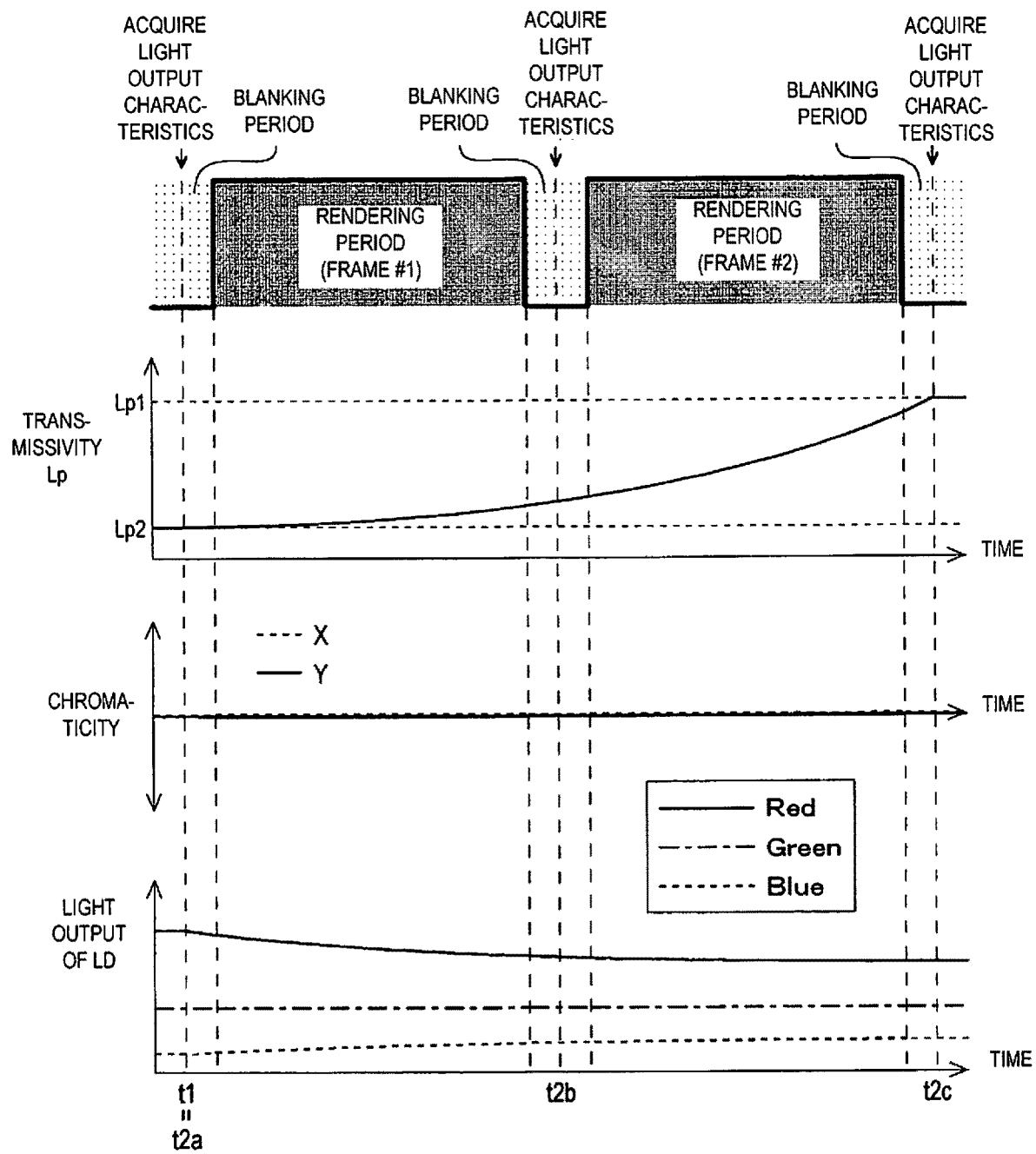
FIG. 9 shows another example of dimming control of laser light pertaining to the first embodiment.

Also, FIG. 8 shows an example of reducing the brightness of the image, but the same control can be performed when increasing the brightness of the image. FIG. 9 shows another example of the dimming control of the laser light 300 pertaining to the first embodiment. In FIG. 9, the dimming of the laser light 300 by the dimming attenuator 20 increases the brightness of the image formed in the display area 112. At the point in time t1, at which dimming of the laser light 300 is commenced, the transmissivity Lp of the liquid crystal element 23 is increased from the control value Lp2 to the control value Lp1 (>Lp2) by increasing the drive voltage applied to the liquid crystal element 23. Therefore, the transmissivity Lp of the liquid crystal element 23 gradually increases up to the point in time t2c at a specific response rate. Here again, chromaticity deviation in the image can be kept within a specific range in the dimming of the laser light 300 by the same dimming control as that shown in FIG. 8.

With this embodiment, the light control section 62 controls the LDs 11a to 11c, which output laser light of mutually different wavelengths, by means of the output of the drive current I (light output signal). The dimming attenuator 20 transmits the laser light 300 at the transmissivity Lp for each wavelength. The transmission control section 63 changes the control value of the transmissivity Lp by means of the output of the drive voltage applied to the liquid crystal element 23 (control signal). The light control section 62 determines the drive current I for the LDs 11a to 11c during the elapsed time based on the elapsed time since the point in time t1 when the control value was changed and the transmissivity information indicating the change in the transmissivity Lp for each wavelength corresponding to this elapsed time.

Thus, when the control value of the transmissivity Lp for each wavelength of the laser light 300 transmitted through the dimming attenuator 20 is changed by the drive voltage (control signal) applied to the liquid crystal element 23, the transmissivity Lp for each wavelength gradually changes toward the control value. Here, the transmissivity Lp for each wavelength at the elapsed time since the point in time t1 when the control value was changed can be predicted based on the elapsed time and the transmissivity information. Therefore, the drive current I of the LDs 11a to 11c at the elapsed time can be determined by feed-forward control using the predicted transmissivity Lp for each wavelength. For example, even though the change in the transmissivity Lp toward the control value is different for each wavelength, the amount of the laser light 300 transmitted through the dimming attenuator 20 can be varied without changing the ratio of the amount of light transmitted through the dimming attenuator 20 for each wavelength. That is, since deviation in the chromaticity of the light of each wavelength generated in the elapsed time can be corrected by feed-forward control, the change in the white balance can be accurately suppressed or prevented, and the amount of laser light 300 transmitted through the light control attenuator 20 can be adjusted (so-called dimming). Thus, the amount of the laser light 300 can be adjusted while keeping the chromaticity deviation of the laser light 300 transmitted through the light control attenuator 20 within a specific range.

The projector unit 1 in this embodiment comprises the LDs 11a to 11c (a plurality of light sources), the dimming attenuator 20 (transmission component), and the controller 60. The LDs 11a to 11c output laser light 300 of mutually different wavelengths. The dimming attenuator 20 transmits the light at the transmissivity Lp of the laser light 300 for each wavelength. For example, the dimming attenuator 20 adjusts the transmissivity Lp of the laser light 300 for each wavelength. In other worlds, the liquid crystal element 23 of the dimming attenuator 20 has an adjustable transmissivity Lp of the laser light 300. The controller 60 controls the amount of light of the LDs 11a to 11c based on the transmissivity information indicating the change in the transmissivity Lp for each wavelength. For example, the light control section 62 (control section) of the controller 60 controls the LDs 11a to 11c. The transmission control section 63 of the controller 60 controls the transmissivity Lp. The light control section 62 controls the amount of light of the LDs 11a to 11c based on the transmissivity information indicating the change in the transmissivity Lp for each wavelength.

With this configuration, when the transmissivity Lp for each wavelength of the laser light 300 transmitted through the dimming attenuator 20 (transmission component) is adjusted for each wavelength, the transmissivity Lp for each wavelength gradually changes toward the adjusted value. Here, the changing transmissivity Lp for each wavelength can be predicted based on the transmissivity information.

Therefore, the amount of the laser light 300 outputted from the LDs 11a to 11c (a plurality of light sources) can be controlled by means of feed-forward control using the predicted transmissivity Lp for each wavelength. For example, even though the change in the transmissivity Lp varies from wavelength to wavelength, the amount of the laser light 300 transmitted through the dimming attenuator 20 can be changed without changing the light amount ratio for each wavelength of the laser light 300 transmitted through the dimming attenuator 20. That is, the deviation in the chromaticity of the laser light 300 for each wavelength being changed can be corrected by feed-forward control. Thus, it is possible to suppress or prevent a change in the white balance with high accuracy, and to adjust the amount of laser light 300 transmitted through the dimming attenuator 20 (so-called dimming). This allows the amount of laser light 300 to be adjusted while keeping the deviation in the chromaticity of the laser light 300 transmitted through the dimming attenuator 20 within a specific range.

Also, the dimming attenuator 20 (transmission component) has the liquid crystal element 23. The liquid crystal element 23 is controlled by the transmission control section 63. The laser light 300 outputted from the LDs 11a to 11c (a plurality of light sources) passes through the liquid crystal element 23 at the transmissivity Lp for each wavelength.

With this configuration, the amount of laser light 300 passing through the liquid crystal element 23 can be controlled while keeping the chromaticity deviation within a specific range.

Also, the liquid crystal element 23 changes the polarization angle of the laser light 300 according to the drive voltage to adjust the transmissivity Lp for each wavelength according to the drive voltage.

Also, the transmission control section 63 of the controller 60 controls the liquid crystal element 23 to change the transmissivity Lp for each wavelength according to the drive voltage applied to the liquid crystal element 23.

Also, the projector unit 1 (light projection device) further comprises the MEMS unit 30 (e.g., the image formation component) that forms the image in each frame on the projection surface 111 by projecting the laser light 300 from the LDs 11a to 11c (a plurality of light sources) onto the projection surface. Thus, the projector unit 1 (light projection device) projects the laser light 300 outputted from the LDs 11a to 11c (a plurality of light sources) onto the projection surface 111, and displays the image in each frame on the projection surface 111. The acquisition component 65 of the controller 60 acquires the light output characteristics of the LDs 11a to 11c during the period between frames of the image. The light control section 62 of the controller 60 further controls the amount of light of the LDs 11a to 11c (a plurality of light sources) for the rendering period for the frame based on the light output characteristics acquired at points in time t2a, t2b, and t2c (first point in time) prior to the rendering period for the frame.

With this configuration, the light output characteristics are acquired at the points in time t2a, t2b, and t2c (first point in time) prior to the rendering period for the frame of the image displayed on the projection surface 111. Then, the amount of light of the LDs 11a to 11c (a plurality of light sources) for the rendering period for the frame after the points in time t2a, t2b, and t2c (first point in time) can be controlled based on these light output characteristics. Therefore, the white balance of the laser light 300 can be controlled more accurately in adjusting (dimming) the amount of the laser light 300 that has passed through the dimming attenuator 20 (transmission component). Thus, the brightness of the image displayed on the projection surface 111 can be adjusted while more accurately keeping chromaticity deviation within a specific range.

Also, the light output characteristics includes relationship between the amount of light and the drive current I.

Also, the light control section 62 of the controller 60 generates the light control signal indicating the drive current I according to the image data and the light output characteristics.

The change in the transmissivity Lp for each wavelength indicated by the transmissivity information when the transmissivity Lp increases is different from that when the transmissivity Lp decreases.

With this configuration, even though change in transmissivity Lp of the dimming attenuator 20 is different when the transmissivity increases and when it decreases, the amount of laser light 300 transmitted through the dimming attenuator 20 can be favorably and accurately controlled by using the transmissivity information.

Also, the transmissivity information indicates the change in the transmissivity Lp for each wavelength according to the elapsed time since the transmissivity Lp is changed. The light control section 62 of the controller 60 controls the amount of light of the LDs 11a to 11c for the elapsed time based on the transmissivity information.

With this configuration, the transmissivity Lp for each wavelength for the elapsed time since the point when the transmissivity Lp is adjusted can be predicted based on the elapsed time and the transmissivity information. Thus, deviation in the chromaticity of the laser light 300 of each wavelength generated in the elapsed time can be corrected by feed-forward control.

Also, the acquisition component 65 of the controller 60 acquires the light output characteristics of the LDs 11a to 11c in the blanking period between frames of the image. The light control section 62 of the controller 60 controls the amount of light of the LDs 11a to 11c based on the elapsed time, the transmissivity information and the light output characteristics.

Also, the projector unit 1 (the light projection device) further comprises the memory component 58 (memory) that stores the transmissivity information.

Also, the light control section 62 of the controller 60 controls each of the LDs 11a to 11c to emit different amount of light in the blanking period between frames of the image to acquire the light output characteristics.

Also, the LDs 11a to 11c include laser diodes of different colors.

Also, the projector unit 1 (light projection device) further comprises the OEIC 26a or 26b (photosensor) configured to sense the amount of light outputted from the LDs 11a to 11c. The acquisition component 65 of the controller 60 acquires the light output characteristics of the LDs 11a to 11c based on the drive current I applied to the LDs 11a to 11c to emit the different amounts of light and the sensing result of the OEIC 26a or 26b.

Also, the light control section 62 of the controller 60 estimates or predicts the change in the transmissivity Lp for each wavelength based on the transmissivity information, and controls the amount of light of the LDs 11a to 11c to maintain ratio of the amount of light (light amount ratio) for each wavelength transmitted through the liquid crystal element 23 (transmission component).

Second Embodiment

Next, a second embodiment will be described. In this second embodiment, the light output of the LDs 11a to 11c in each rendering period for the frame is controlled based on the sensing result for the temperature of the dimming attenuator 20 (and particularly the liquid crystal element 23) in a transient state. A configuration different from that of the first embodiment is described below. Those components that are the same as in the first embodiment are labeled the same and will not be described again.

Figure 10:
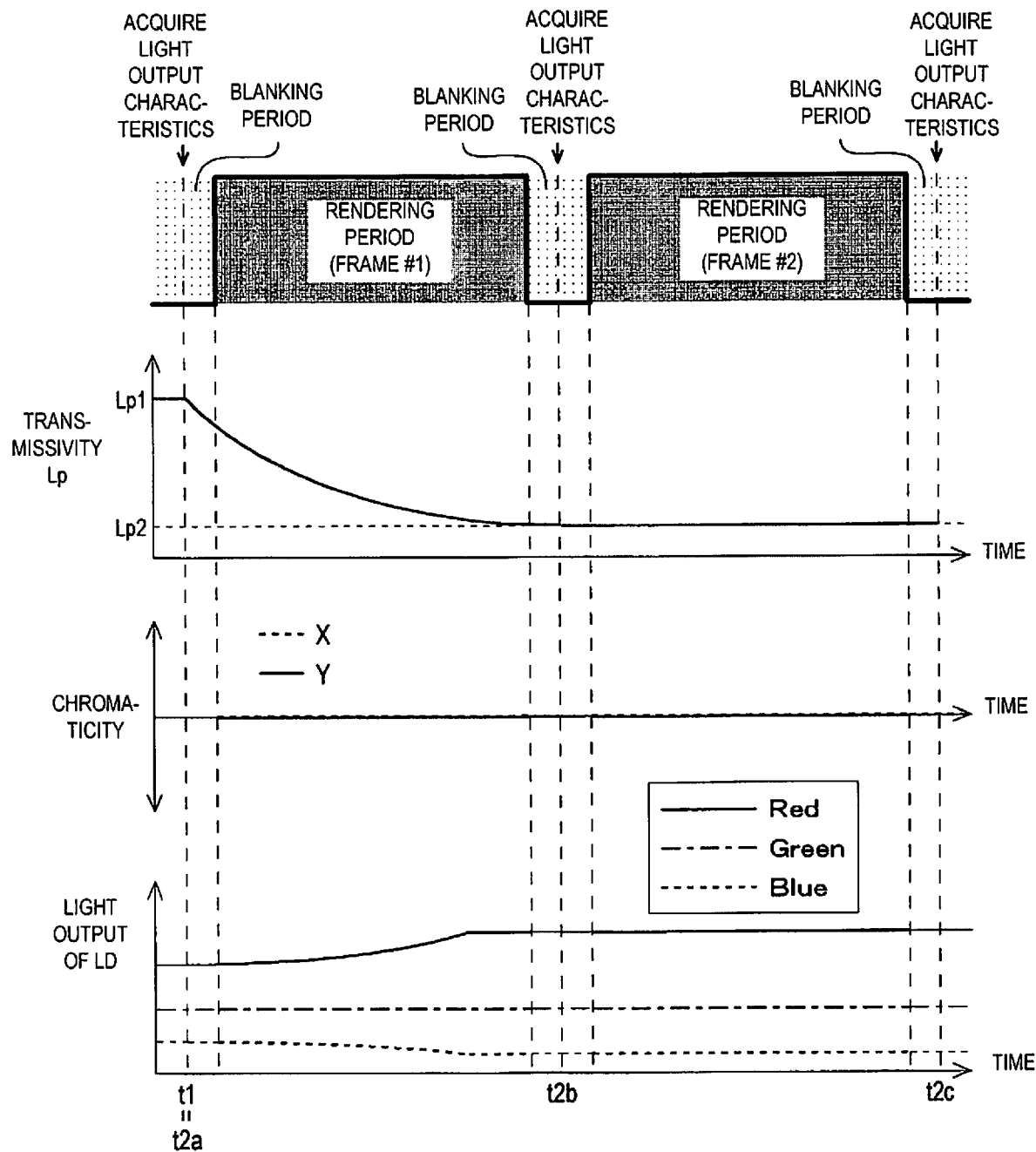
FIG. 10 shows an example of dimming control of the laser light pertaining to a second embodiment.

FIG. 10 shows an example of dimming control of the laser light 300 pertaining to the second embodiment. FIG. 10 shows dimming control when the element temperature of the liquid crystal element 23 is relatively high, but dimming control can be carried out in the same way when the element temperature is relatively low.

The response rate of the liquid crystal element 23 with respect to drive voltage is proportional to the element temperature. That is, when the element temperature is higher, the response time until the transmissivity Lp reaches the control value Lp2 is shorter, as shown in FIG. 10. On the other hand, when the element temperature is lower, the response time of the transmissivity Lp is longer. Therefore, the transmissivity information stored in the memory component 58 includes temperature characteristic information related to the temperature characteristics of the transmissivity Lp for each wavelength corresponding to the elapsed time since the point in time t1 when the control value of the transmissivity Lp was changed. The temperature characteristic information may be, for example, information indicating for each temperature the transmissivity Lp for each wavelength corresponding to the elapsed time. Alternatively, the temperature characteristic information may be information for correcting the transmissivity Lp for each wavelength corresponding to the elapsed time at a specific reference temperature, based on the actual element temperature.

In FIG. 10, the drive currents I for the LDs 11a to 11c at the elapsed time since the point in time t1 are each determined and generated based on the elapsed time since the point in time t1, the transmissivity information, the light output characteristics acquired at the points in time t2a, t2b, and t2c, and the sensing result of the thermistor 27, and are then outputted. Consequently, the amount of light of the LDs 11a to 11c is controlled. For example, the transmissivity Lp of the liquid crystal element 23 is predicted based on the elapsed time since the point in time t1 in the rendering period for frame #1, the element temperature of the liquid crystal element 23 based on the sensing result of the thermistor 27, and the transmissivity information including temperature characteristic information. Then, the drive currents I of the LDs 11a to 11c in the rendering period of frame #1 are determined based on the predicted transmissivity Lp and the light output characteristics acquired at the point in time t2a.

In this embodiment, the projector unit 1 further comprises the thermistor 27 (temperature sensor). The thermistor 27 senses the temperature of the dimming attenuator 20 (transmission component). The transmissivity information includes information related to the temperature characteristics of the transmissivity Lp. The light control section 62 (control section) of the controller 60 controls the amount of light of the LDs 11a to 11c (a plurality of light sources) based on the sensing result of the thermistor 27.

With this configuration, even though the change in the transmissivity Lp for each wavelength of the laser light 300 transmitted through the dimming attenuator 20 (transmission component) varies with the temperature of the dimming attenuator 20, the amount of the laser light 300 transmitted through the dimming attenuator 20 can be controlled based on the sensing result of the thermistor 27.

Third Embodiment

Next, a third embodiment will be described. In this third embodiment, the actual transmissivity Lp of the liquid crystal element 23 is measured based on the sensing results of the OEICs 26a and 26b. Also, the response rate of the transmissivity Lp is detected based on the result of measuring the transmissivity Lp in each blanking period before and after the rendering period of frame #1. This detection result is reflected in the light output control of the LDs 11a to 11c in the rendering period for the next frame. A configuration different from that in the first and second embodiments will now be described. Those components that are the same as in the first and second embodiment will be labeled the same and will not be described again.

Figure 11:
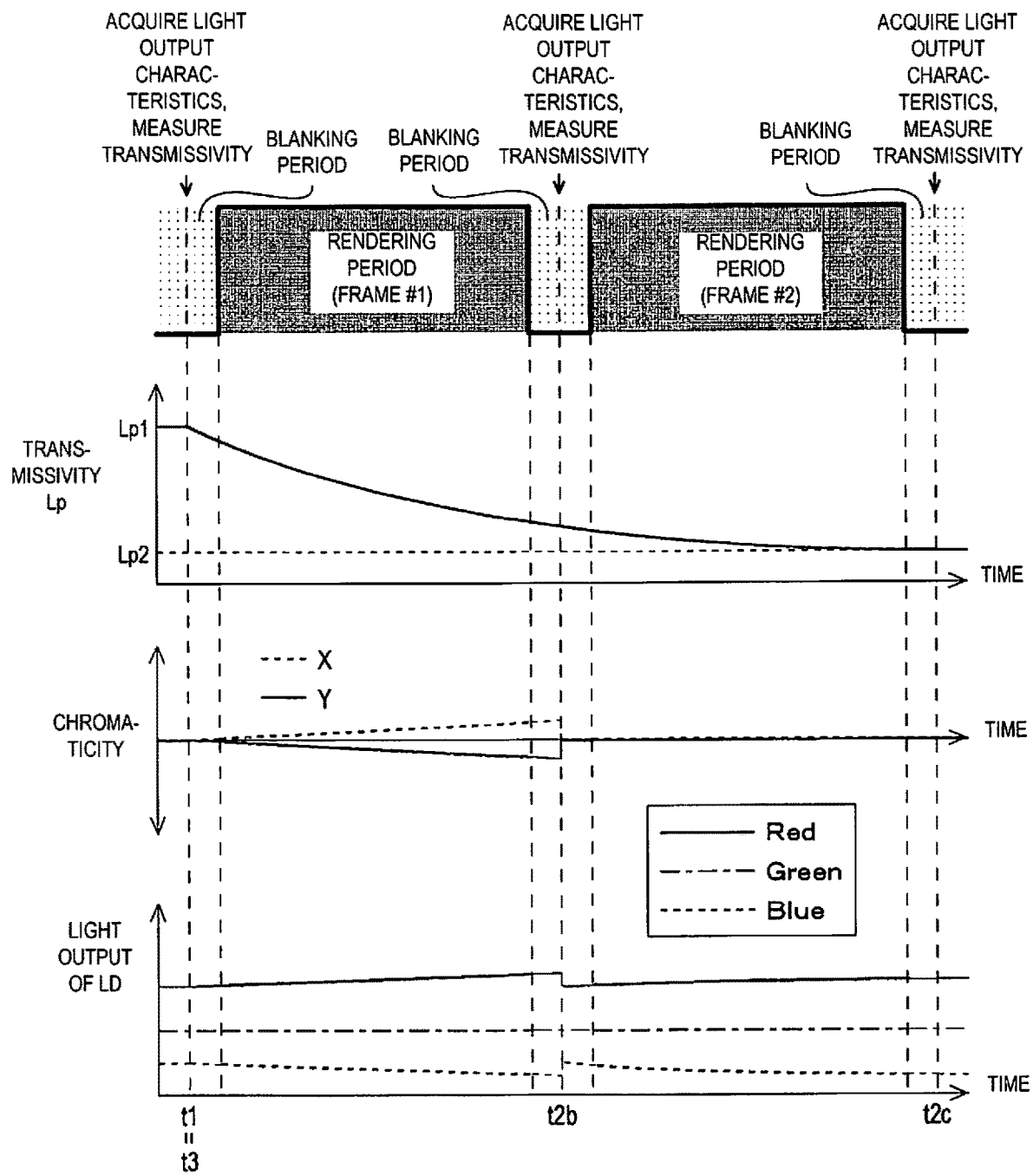
FIG. 11 shows an example of dimming control of the laser light pertaining to a third embodiment.

FIG. 11 shows an example of dimming control of the laser light 300 pertaining to the third embodiment. In FIG. 11, the light output characteristics of the LDs 11a to 11c are acquired at the points in time t3 (=t1), t2b, and t2c during each blanking period. In the rendering period for frame #1, the drive currents I of the LDs 11a to 11c are determined based on the elapsed time since the point in time t1, the transmissivity information, and the light output characteristics acquired at the point in time t3.

Also, at the point in time t3 in the blanking period before the rendering period of the frame #1, and at the point in time t2b in the blanking period after the rendering period of the frame #1, the light control section 62 causes the LDs 11a to 11c to output laser light having the same light output as the rendering period for frame #1, for example. The detecting section 66 detects the actual transmissivity Lp of the liquid crystal element 23 for each wavelength based on the sensing results of the OEICs 26a and 26b at the points in time t3 and t2b. The detecting section 66 further detects for each wavelength the change rate (that is, the response rate) of the transmissivity Lp in the rendering period for frame #1 based on the detection results at the points in time t3 and t2b. The light control section 62 compares the detected change rate with the change rate of the transmissivity Lp of the liquid crystal element 23 indicated by the transmissivity information. If the discrepancy between the two is at or over a threshold, the light control section 62 causes the detection result for the change rate in the transmissivity Lp to be reflected in the light output control of the LDs 11a to 11c in the rendering period for frame #2.

That is, in the rendering period for frame #2, the light control section 62 determines and generates the drive currents I of the LDs 11a to 11c in the rendering period of the frame #2 based on the elapsed time since the point in time t1, the transmissivity Lp corresponding to the elapsed time indicated by the transmissivity information, the light output characteristics acquired at the point in time t2b, and the detection result for the change rate in the transmissivity Lp, and outputs the results. This controls the amount of light of the LDs 11a to 11c. Here, when the deviation amount between the two is a specific value or more, the light control section 62 offsets the amount of deviation between the two to the change rate (response rate) of the transmissivity Lp of the liquid crystal element 23 indicated by the transmissivity information in the rendering period for frame #2. For example, the detecting section 66 detects the difference between the transmissivity Lp indicated by the transmissivity information and the actual transmissivity Lp at the point in time t2b. Then, in the elapsed time since the point in time t2b, the light control section 62 may determine the drive currents I of the LDs 11a to 11c in the rendering period for frame #2 based on the time elapsed time, the sum of the above-mentioned difference and the transmissivity Lp corresponding to the elapsed time indicated by the transmissivity information, and the light output characteristics acquired at the point in time t2b.

This way, even if chromaticity deviation cannot be sufficiently corrected in dimming control of the rendering period of frame #1, dimming control in the rendering period for frame #2 can be optimized by taking into account the amount of discrepancy between the detection result for change rate in the transmissivity Lp and the response rate of the transmissivity Lp indicated by the transmissivity information. This improves the chromaticity deviation in the rendering period for frame #2, as shown in FIG. 11.

In FIG. 11, the point in time t1 at which the dimming of the laser light 300 is commenced is the same as the point in time t3 at which the light output characteristics are acquired, but this is not the only option, and the point in time t1 may be earlier than the point in time t3. That is, the point in time t3 should be at or after the point in time t1, and earlier than the point in time t2 (t1≤t3<t2).

In this embodiment, the projector unit 1 further comprises the OEIC 26a (first photosensor) and the OEIC 26b (second photosensor). The OEIC 26a senses the amount of laser light 300 inputted to the dimming attenuator 20 (transmission component) for each wavelength. The OEIC 26b senses the amount of laser light 300 outputted by the dimming attenuator 20 for each wavelength. The detecting section 66 of the controller 60 detects the transmissivity Lp for each wavelength of the light control attenuator 20 based on the sensing result of the OEIC 26a and the sensing result of the OEIC 26a.

With this configuration, the actual transmissivity Lp for each wavelength at the point in time t3 (t1≤t3<t2b; third point in time) and the point in time t1 (second point in time) can be measured based on the sensing result of the OEIC 26a (first photosensor) and the sensing result of the OEIC 26b (second photosensor). Also, the change rate (that is, the response rate) in the transmissivity Lp for each wavelength can be detected from the measurement results at the point in time t3 (third point in time) and point in time t1 (second point in time).

Also, the detecting section 66 of the controller 60 further detects the change rate in the transmissivity Lp based on the detection result for the transmissivity Lp at the point in time t3 that is at or after the point in time t1 (second point in time) at which the transmissivity Lp was changed and before the point in time t2b (first point in time) (t1≤t3<t2b; third point in time), and the detection result for the transmissivity Lp at the point in time t1 (second point in time). The light control section 62 (control section) of the controller 60 further controls the amount of light of the LDs 11a to 11c (a plurality of light sources) in the rendering period for frame #2 based on the detection result for the change rate.

With this configuration, the amount of light of the LDs 11a to 11c (a plurality of light sources) in the rendering period for frame #2 after the point in time t2b (first point in time) can be further controlled based on the detected change rate. Therefore, in the rendering period for frame #2 after the point in time t2b (first point in time), the white balance of the laser light 300 can be controlled even more accurately in the adjustment (dimming) of the laser light 300 that has passed through the dimming attenuator 20 (transmission component).

Fourth Embodiment

Next, a fourth embodiment will be described. In the fourth embodiment, the actual transmissivity Lp of the liquid crystal element 23 is measured at different points in time t3 and t2a within the same blanking period. Also, the change rate (that is, the response rate) of the transmissivity Lp is detected based on the measurement results at the points in time t3 and t2a. This detection result is then reflected in the light output control of the LDs 11a to 11c in the rendering period for the next frame. The configuration that differs from that of the first to third embodiments will now be described. Also, those components that are the same as in the first to third embodiments will be labeled and the same and will not be described again.

Figure 12:
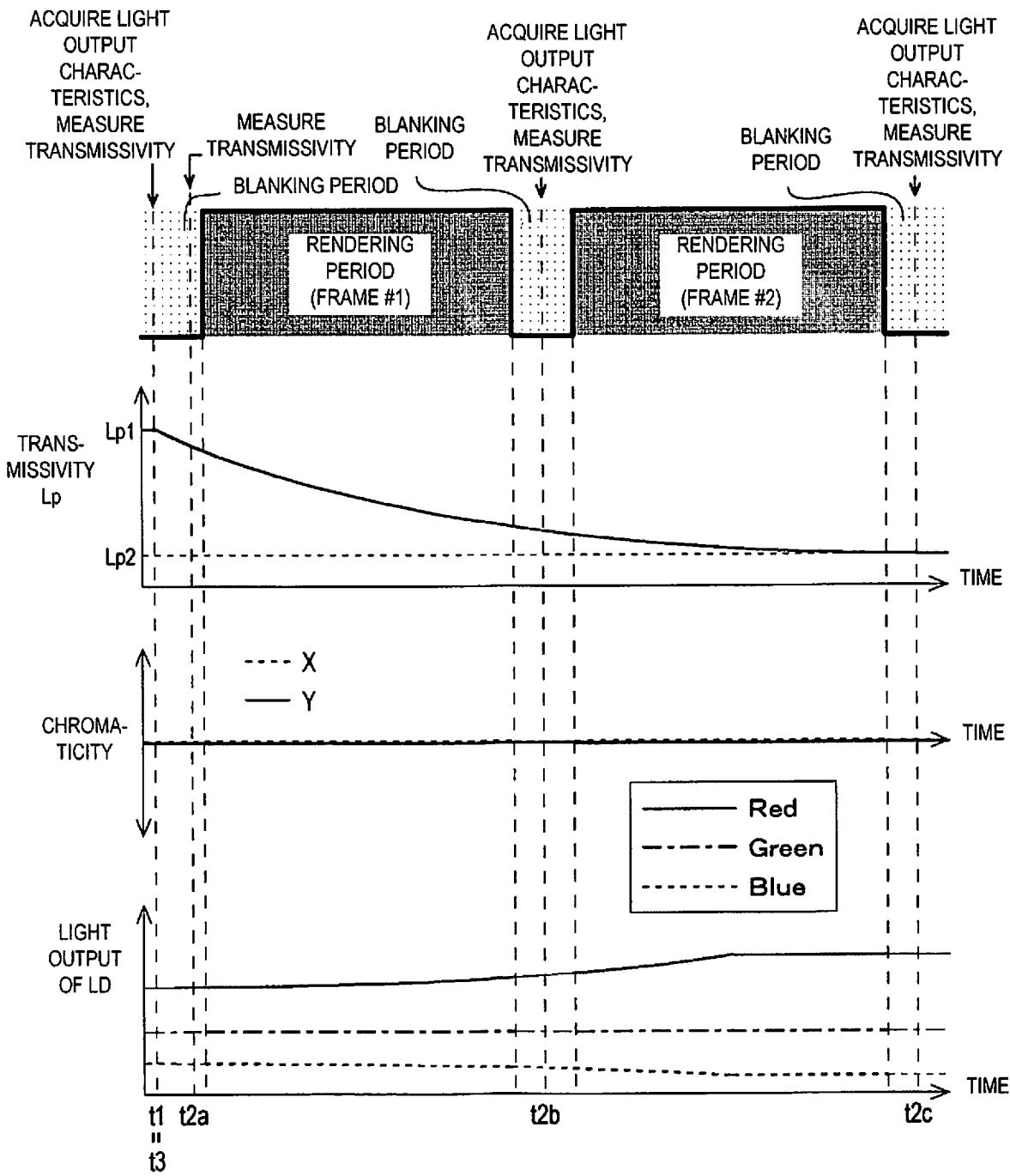
FIG. 12 shows an example of dimming control of the laser light pertaining to a fourth embodiment.

FIG. 12 shows an example of dimming control of the laser light 300 pertaining to a fourth embodiment. In FIG. 12, the light output characteristics of the LDs 11a to 11c are acquired at the points in time t3, t2b, and t2c in each blanking period. In the blanking period before the rendering period of frame #1, light output characteristics of the LDs 11a to 11c may be acquired at the point in time t2a.

At the point in time t2a in the same blanking period before the rendering period of frame #1 and the point in time t3 that is before the point in time t2a, the light control section 62 causes the LDs 11a to 11c to output laser light at the same light output as in the rendering period for frame #1. The detecting section 66 detects the actual transmissivity Lp of the liquid crystal element 23 for each wavelength based on the sensing results of the OEICs 26a and 26b at the points in time t3 and t2a. The detecting section 66 further detects the change rate (that is the response rate) in the transmissivity Lp based on the detection results at the points in time t3 and t2a for each wavelength. The light control section 62 compares the detected change rate with the change over time in the transmissivity Lp of the liquid crystal element 23 indicated by the transmissivity information. Then, if the discrepancy between the two is at or over a threshold, the light control section 62, just as in the third embodiment, causes the detection result for the change rate in the transmissivity Lp to be reflected in the light output control of the LDs 11a to 11c in rendering periods after the point in time t2a (such as the rendering periods for frames #1, #2, etc.).

Figure 13:
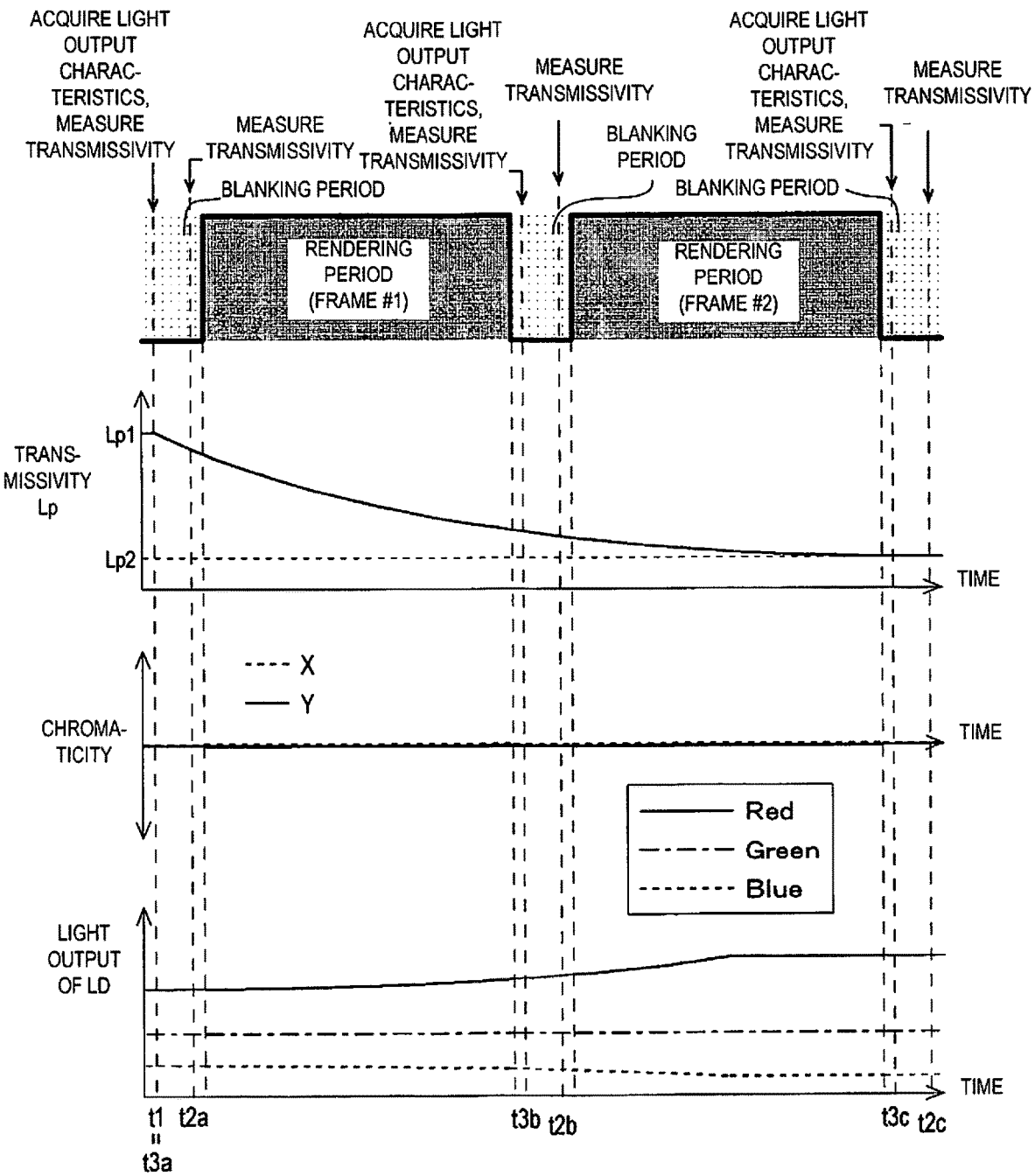
FIG. 13 shows another example of dimming control of laser light pertaining to the fourth embodiment.

In FIG. 12, light output control that takes into account the sensing of the discrepancy between the value indicated by the transmissivity information and the actual detected value for the change rate in the transmissivity Lp, as well as the detection result thereof, is carried out in a blanking period prior to the rendering period for frame #1, but this is not the only option. Light output control that takes into account the sensing of this discrepancy and the detection result thereof may be carried out in the blanking periods before each of the rendering periods for the frame, as shown in FIG. 13.

Also, in FIG. 12, point in time t1 at which dimming of the laser light 300 is commenced is the same as the point in time t3 at which the light output characteristics are acquired, but this is not the only option, and the point in time t1 may be before the point in time t3. That is, the point in time t3 should be at or after the point in time t1 and before the point in time t2a ($t2a \leq t3 < t2a$). The same applies to FIG. 13.

In this embodiment, the point in time t2a (first point in time) and the point in time t3 (third point in time) are within the same blanking period between frames of the images.

With this configuration, the change rate (that is, the response rate) in the transmissivity Lp for each wavelength can be detected based on the transmissivity Lp for each wavelength actually measured at the point in time t2a (first point in time) and the point in time t3 (third point in time) in the same blanking period between image frames. Then, the amount of light of the LDs 11a to 11c (a plurality of light sources) in the rendering period of the frame after the above-mentioned same blanking period can be controlled. Therefore, the amount of light of the LDs 11a to 11c in the rendering period can be controlled from the first frame of the image displayed on the projection surface 111. This allows the adjustment of the brightness of the image displayed on the projection surface 111 to be performed from the very first frame.

Embodiments of the present invention were described above. However, it will be understood by those skilled in the art that the above embodiments just examples, that combinations of the constituent elements and processing thereof can be variously modified, and that all of this falls within the scope of the present invention.

For example, in the first to fourth embodiments give above, the HUD device 100 may be configured such that it comprises the projector unit 1, and an image is displayed on the inner surface of the windshield 201 by means of scanned laser light 300. That is, the HUD device 100 need not be equipped with the combiner 110, and the inner surface of the windshield 201 may serve as the projection surface 111.

Also, the first to fourth embodiments may be implemented in combination, so long as this poses no particular contradiction.

[1] In view of the state of the known technology and in accordance with an aspect of the present invention, a light projection device comprises a plurality of light sources, a transmission component and a controller. The light sources are configured to output light of mutually different wavelengths. The transmission component is configured to transmit the light at a transmissivity of the light for each wavelength. The controller is configured to control amount of light of the light sources based on transmissivity information indicating a change in the transmissivity for each wavelength. For example, a control section of the controller controls the light sources. The transmission component adjusts the transmissivity of the light for each wavelength. A transmission control section of the controller controls the transmissivity. The control section of the controller controls the amount of light of the light sources based on the transmissivity information indicating the change in the transmissivity for each wavelength.

With this configuration above, when the transmissivity of the light transmitted through the transmission component is adjusted for each wavelength, the transmissivity for each wavelength gradually changes toward the adjusted value. At this time, the changing transmissivity for each wavelength can be predicted based on the transmissivity information. Accordingly, the amount of light outputted from the light sources can be controlled by feed-forward control using the predicted transmissivity for each wavelength. For example, even though the change in transmissivity varies from wavelength to wavelength, the amount of light transmitted through the transmission component can be changed without changing the light amount ratio for each wavelength of the light transmitted through the transmission component. That is, the deviation in the chromaticity of the light for each wavelength being changed can be corrected by the feed-forward control. Thus, it is possible to suppress or prevent a change in the white balance with high accuracy, and to adjust the amount of light transmitted through the transmission component. This allows the amount of light to be adjusted while keeping the deviation in the chromaticity of the light transmitted through the transmission component within a specific range.

[2] In accordance with a preferred embodiment according to the light projection device mentioned above, the transmission component has a liquid crystal element. The light outputted from the light sources is transmitted through the liquid crystal element at the transmissivity for each wavelength. For example, the liquid crystal element is controlled by the transmission control section of the controller.

With this configuration, it is possible to control the amount of light transmitted through the liquid crystal element while keeping the chromaticity deviation within a specific range.

[3] In accordance with a preferred embodiment according to any one of the light projection devices mentioned above, the liquid crystal element is configured to change polarization angle of the light according to a drive voltage to adjust the transmissivity for each wavelength according to the drive voltage.

[4] In accordance with a preferred embodiment according to any one of the light projection devices mentioned above, the controller controls the liquid crystal element to change the transmissivity for each wavelength according to a drive voltage applied to the liquid crystal element.

[5] In accordance with a preferred embodiment according to any one of the light projection devices mentioned above, the light projection device further comprises an image formation component configured to form an image in each frame on a projection surface by projecting the light from the light sources onto the projection surface. The controller is further configured to acquire light output characteristics of the light sources in a period between frames of the image, and configured to control the amount of light of the light sources for a rendering period for a frame based on the light output characteristics acquired at a first point in time prior to the rendering period for the frame. For example, the light projection device projects the light outputted from the light sources onto the projection surface and displays the image on the projection surface in each frame. An acquisition component of the controller acquires the light output characteristics of the light sources in the period between the frames of the image. The control section of the controller further controls the amount of light of the light sources for the rendering period for the frame based on the light output characteristics acquired at the first point in time prior to the rendering period for the frame.

With this configuration, the light output characteristics are acquired at the first point in time before the rendering period for the frame of the image displayed on the projection surface. Then, the amount of light of the light sources for the rendering period for the frame after the first point in time can be controlled based on the light output characteristics. This makes it possible to control the white balance of the light more accurately when the amount of light transmitted through the transmission component is adjusted (dimming). Therefore, the brightness of the image displayed on the projection surface can be adjusted while more accurately keeping the deviation of chromaticity within a specific range.

[6] In accordance with a preferred embodiment according to any one of the light projection devices mentioned above, the light output characteristics includes relationship between the amount of light and drive current.

[7] In accordance with a preferred embodiment according to any one of the light projection devices mentioned above, the controller being further configured to generate light control signal indicating the drive current according to image data and the light output characteristics.

[8] In accordance with a preferred embodiment according to any one of the light projection devices mentioned above, the light projection device further comprise a first photosensor and a second sensor. The first photosensor is configured to sense the amount of light inputted to the transmission component for each wavelength. The second photosensor is configured to sense the amount of light outputted by the transmission component for each wavelength. The controller (e.g., a detecting section of the controller) is further configured to detect the transmissivity for each wavelength based on sensing result of the first photosensor and the sensing result of the second photosensor.

With this configuration, the actual transmissivity for each wavelength at a third point in time and the first point in time can be measured based on the sensing result of the first photosensor and the sensing result of the second photosensor. Also, the change rate in the transmissivity for each wavelength (that is, the response rate) can be detected from the measurement results at the third point in time and the first point in time.

[9] In accordance with a preferred embodiment according to any one of the light projection devices mentioned above, the controller (e.g., the detecting section of the controller) is further configured to detect change rate in the transmissivity based on detection result for the transmissivity at a third point in time that is before the first point in time and after the second point in time at which the transmissivity is changed, and detection result for the transmissivity at the first point in time. The controller (e.g., the control section of the controller) is further configured to control the amount of light of the light sources for a rendering period for a frame based on detection result for the change rate.

With this configuration, the amount of light of the light sources for the rendering period for the frame after the first point in time can be controlled based on the detected change rate. Therefore, the white balance of the light can be controlled more accurately when adjusting (dimming) the light amount of the light transmitted through the transmission component during the rendering period for the frame after the first point in time.

[10] In accordance with a preferred embodiment according to any one of the light projection devices mentioned above, the first point in time and the third point in time are within a same period between frames of the image.

With this configuration, the change rate in the transmissivity for each wavelength (that is, the response rate) can be detected based on the transmissivity for each wavelength actually measured at the first point in time and the third point in time within the same period between frames of the image. The amount of light of the light sources for the rendering period for the frame after this same period can then be controlled. Therefore, the amount of light of the light sources for the rendering period for the frame can be controlled from the first frame of the image displayed on the projection surface, for example. Thus, it is possible to adjust the brightness of the image displayed on the projection surface from the very first frame.

[11] In accordance with a preferred embodiment according to any one of the light projection devices mentioned above, the light projection device further comprises a temperature sensor configured to sense temperature of the transmission component. The transmissivity information includes information related to the temperature characteristics of the transmissivity. The controller (e.g., the control section of the controller) is further configured to control the amount of light of the light sources based on the sensing result of the temperature sensor.

With this configuration, even when the change in transmissivity for each wavelength of the light transmitted through the transmission component varies depending on the temperature of the transmission component, the amount of light transmitted through the transmission component can be controlled based on the sensing result of the temperature sensor.

[12] In accordance with a preferred embodiment according to any one of the light projection devices mentioned above, the change in the transmissivity for each wavelength indicated by the transmissivity information when the transmissivity increases is different from that when the transmissivity decreases.

With this configuration, even when the change in the transmissivity of the transmission component is different when increasing and decreasing, the amount of light transmitted through the transmission component can be suitably controlled with high accuracy by using the transmissivity information.

[13] In accordance with a preferred embodiment according to any one of the light projection devices mentioned above, the transmissivity information indicates the change in the transmissivity for each wavelength according to the elapsed time since the transmissivity is changed. The controller (e.g., the control section of the controller) is further configured to control the amount of light of the light sources for the elapsed time based on the transmissivity information.

With the ninth configuration, the transmissivity for each wavelength for the elapsed time since the point when the transmissivity is adjusted can be predicted based on the elapsed time and the transmissivity information. Thus, deviation in the chromaticity of the light of each wavelength generated in the elapsed time can be corrected by feedforward control.

[14] In accordance with a preferred embodiment according to any one of the light projection devices mentioned above, the controller is further configured to acquire light output characteristics of the light sources in a period between frames of the image, and configured to control the amount of light of the light sources based on the elapsed time, the transmissivity information and the light output characteristics.

[15] In accordance with a preferred embodiment according to any one of the light projection devices mentioned above, the light projection device further comprises a memory configured to store the transmissivity information.

[16] In accordance with a preferred embodiment according to any one of the light projection devices mentioned above, the controller is configured to control each the light sources to emit different amount of light in the period between frames of the image to acquire the light output characteristics.

[17] In accordance with a preferred embodiment according to any one of the light projection devices mentioned above, the light sources include laser diodes of different colors.

[18] In accordance with a preferred embodiment according to any one of the light projection devices mentioned above, the period between frames of the image is a blanking period between adjacent pair of frames of the image.

[19] In accordance with a preferred embodiment according to any one of the light projection devices mentioned above, the light projection device further comprises a photosensor configured to sense the amount of light outputted from the light sources. The controller is further configured to acquire the light output characteristics of the light sources based on drive current applied to the light sources to emit the different amounts of light and sensing result of the photosensor.

[20] In accordance with a preferred embodiment according to any one of the light projection devices mentioned above, the controller is configured to estimate the change in the transmissivity for each wavelength based on the transmissivity information, and control the amount of light of the light sources to maintain ratio of the amount of light for each wavelength transmitted through the transmission component.

The present invention provides a light projection device with which the amount of light can be adjusted while maintaining the deviation of the chromaticity of this light within a specific range.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A light projection device comprising:
    a plurality of light sources that outputs light of mutually different wavelengths;
    a transmission component that transmits the light at a transmissivity of the light for each wavelength according to a transmissivity control value; and
    a controller that changes the transmissivity control value, and controls, in response to changing the transmissivity control value, amount of light of the light sources according to elapsed time that is an amount of time that passes from a timing when the controller starts changing the transmissivity control value using feed-forward control based on the elapsed time and transmissivity information indicating a change in the transmissivity for each wavelength according to the elapsed time.

2. The light projection device according to claim 1, wherein the transmission component has a liquid crystal element through which the light outputted from the light sources is transmitted at the transmissivity for each wavelength.

3. The light projection device according to claim 2, wherein
the liquid crystal element changes polarization angle of the light according to a drive voltage to adjust the transmissivity for each wavelength according to the drive voltage.

4. The light projection device according to claim 2, wherein
the controller controls the liquid crystal element to change the transmissivity for each wavelength according to a drive voltage applied to the liquid crystal element.

5. The light projection device according to claim 1, further comprising
an image formation component that forms an image in each frame on a projection surface by projecting the light from the light sources onto the projection surface,
the controller acquiring light output characteristics of the light sources in a period between frames of the image, and controlling the amount of light of the light sources for a rendering period for a frame based on the light output characteristics acquired at a first point in time prior to the rendering period for the frame.

6. The light projection device according to claim 5, wherein
the light output characteristics includes relationship between the amount of light and drive current.

7. The light projection device according to claim 6, wherein
the controller generates light control signal indicating the drive current according to image data and the light output characteristics.

8. The light projection device according to claim 1, further comprising
a first photosensor that senses the amount of light inputted to the transmission component for each wavelength,
a second photosensor that senses the amount of light outputted by the transmission component for each wavelength,
the controller detecting the transmissivity for each wavelength based on sensing result of the first photosensor and sensing result of the second photosensor.

9. The light projection device according to claim 8, wherein
the controller detects change rate in the transmissivity based on detection result for the transmissivity at a third point in time that is before the first point in time and after a second point in time at which the transmissivity is changed, and detection result for the transmissivity at the first point in time, and
the controller controls the amount of light of the light sources for a rendering period for a frame based on detection result for the change rate.

10. The light projection device according to claim 9, wherein
the first point in time and the third point in time are within a same period between frames of the image.

11. The light projection device according to claim 1, further comprising
a temperature sensor that senses temperature of the transmission component,
the transmissivity information including information related to temperature characteristics of the transmissivity, and
the controller controlling the amount of light of the light sources based on sensing result of the temperature sensor.

12. The light projection device according to claim 1, wherein
the change in the transmissivity for each wavelength indicated by the transmissivity information when the transmissivity increases is different from that when the transmissivity decreases.

13. The light projection device according to claim 1, wherein
the controller acquires light output characteristics of the light sources in a period between frames of the image, and controls the amount of light of the light sources based on the elapsed time, the transmissivity information and the light output characteristics.

14. The light projection device according to claim 1, further comprising
a memory that stores the transmissivity information.

15. The light projection device according to claim 5, wherein
the controller controls each of the light sources to emit different amounts of light in the period between frames of the image to acquire the light output characteristics.

16. The light projection device according to claim 1, wherein
the light sources include laser diodes of different colors.

17. The light projection device according to claim 15, wherein
the period between frames of the image is a blanking period between adjacent pair of frames of the image.

18. The light projection device according to claim 17, further comprising
a photosensor that senses the amount of light outputted from the light sources,
the controller acquiring the light output characteristics of the light sources based on drive current applied to the light sources to emit the different amounts of light and sensing result of the photosensor.

19. The light projection device according to claim 1, wherein
the controller estimates the change in the transmissivity for each wavelength based on the transmissivity information, and controls the amount of light of the light sources to maintain ratio of the amount of light for each wavelength transmitted through the transmission component.

* * * * *